United States Patent
Zhan

(10) Patent No.: US 9,775,051 B2
(45) Date of Patent: Sep. 26, 2017

(54) APPARATUS AND METHODS FOR RADIO FREQUENCY SIGNAL BOOSTERS

(71) Applicant: CELLPHONE-MATE, INC., Fremont, CA (US)

(72) Inventor: Hongtao Zhan, Fremont, CA (US)

(73) Assignee: CELLPHONE-MATE, INC., Fremont, CA (US)

( * ) Notice: Subject to any disclaimer, the term of this patent is extended or adjusted under 35 U.S.C. 154(b) by 0 days.

(21) Appl. No.: 14/982,754

(22) Filed: Dec. 29, 2015

(65) Prior Publication Data

US 2016/0198347 A1     Jul. 7, 2016

Related U.S. Application Data

(60) Provisional application No. 62/099,419, filed on Jan. 2, 2015, provisional application No. 62/263,506, filed on Dec. 4, 2015.

(51) Int. Cl.
*H04W 16/26*      (2009.01)
*H04B 1/40*      (2015.01)
(Continued)

(52) U.S. Cl.
CPC ............. *H04W 16/26* (2013.01); *H04B 1/40* (2013.01); *H04B 7/15564* (2013.01); *H04W 84/12* (2013.01); *H04W 88/085* (2013.01)

(58) Field of Classification Search
CPC ... H04W 16/26; H04W 74/12; H04W 88/085; H04B 1/40
(Continued)

(56) References Cited

U.S. PATENT DOCUMENTS 6,329,949 B1 * 12/2001 Barnett .................. H01Q 1/246
                                                                 333/202
6,570,858 B1     5/2003   Emmons et al.
(Continued)

OTHER PUBLICATIONS

PCT Invitation to Pay Additional Fees and, Where Applicable, Protest Fee mailed Mar. 24, 2016 in International Application No. PCT/US2015/067898 (9 pages).
(Continued)

*Primary Examiner* — Edward Urban
*Assistant Examiner* — Ralph H Justus
(74) *Attorney, Agent, or Firm* — Knobbe Martens Olson & Bear LLP

(57) ABSTRACT

Radio frequency (RF) signal boosters are provided. A radio frequency signal booster can include a housing integrated with a base station antenna. The booster includes a mobile station antenna port, and downlink and uplink amplifiers within the housing. The base station antenna can receive wireless communications signals on one or more downlink channels and transmit wireless communications signals on one or more uplink channels. Also, the mobile station antenna port can be connected to an integrated or separate mobile station antenna, which can provide communications signals on one or more downlink channels and receive wireless communications on one or more uplink channels. An isolator in the form of a reflector integrated with the housing can isolate the mobile station antenna from the base station antenna.

32 Claims, 27 Drawing Sheets

(51) Int. Cl.
*H04B 7/155* (2006.01)
*H04W 84/12* (2009.01)
*H04W 88/08* (2009.01)

(58) Field of Classification Search
USPC .................................. 455/7, 15, 11.1, 13.4
See application file for complete search history.

(56) References Cited

U.S. PATENT DOCUMENTS

| | | | |
|---|---|---|---|
| 6,731,904 | B1 | 5/2004 | Judd |
| 6,864,853 | B2 † | 3/2005 | Judd |
| 7,729,656 | B2 | 6/2010 | Van Buren |
| 7,783,318 | B2 | 8/2010 | Wilson et al. |
| 7,813,314 | B2 * | 10/2010 | Fulknier ............... H04L 45/00 370/328 |
| 8,244,173 | B2 † | 8/2012 | Moon |
| 8,498,234 | B2 * | 7/2013 | Proctor ............. H04B 7/15507 370/279 |
| 8,867,572 | B1 | 10/2014 | Zhan |
| 8,971,796 | B2 † | 3/2015 | Judd |
| 9,100,839 | B2 | 8/2015 | Zhan |
| 2002/0034958 | A1 † | 3/2002 | Oberschmidt |
| 2004/0110469 | A1 * | 6/2004 | Judd ................... G01S 19/25 455/15 |
| 2004/0160376 | A1 | 8/2004 | Hornsby et al. |
| 2004/0192194 | A1 * | 9/2004 | Zhen ..................... H03F 3/62 455/11.1 |
| 2005/0227652 | A1 | 10/2005 | Kang et al. |
| 2006/0205343 | A1 * | 9/2006 | Runyon ............. H04B 7/15542 455/11.1 |
| 2007/0071128 | A1 | 3/2007 | Meir et al. |
| 2008/0081555 | A1 * | 4/2008 | Kong ................. H04B 7/15564 455/11.1 |
| 2008/0225758 | A1 * | 9/2008 | Proctor ............. H04B 7/15542 370/279 |
| 2008/0233865 | A1 | 9/2008 | Malarky et al. |
| 2010/0029197 | A1 * | 2/2010 | Judd ................... G01S 19/25 455/11.1 |
| 2010/0075596 | A1 | 3/2010 | Demarco et al. |
| 2010/0197222 | A1 * | 8/2010 | Scheucher ............ H01Q 19/30 455/11.1 |
| 2010/0202325 | A1 | 8/2010 | Poulin et al. |
| 2012/0257051 | A1 * | 10/2012 | Cheng .................. H04N 7/18 348/143 |
| 2012/0302188 | A1 | 11/2012 | Sahota et al. |
| 2013/0203404 | A1 * | 8/2013 | Cook .................. H04W 24/02 455/423 |
| 2013/0222201 | A1 * | 8/2013 | Ma ................... H04W 84/042 343/834 |
| 2013/0242852 | A1 * | 9/2013 | Petros ................ H04W 88/04 370/315 |
| 2014/0016525 | A1 | 1/2014 | Yoshizawa |
| 2014/0038531 | A1 | 2/2014 | Hayafuji Hisao et al. |
| 2014/0134944 | A1 * | 5/2014 | Schwengler ............ H04B 3/52 455/14 |
| 2014/0187173 | A1 * | 7/2014 | Partee ................. H04B 17/00 455/67.12 |
| 2014/0292593 | A1 | 10/2014 | Thiam et al. |
| 2014/0321353 | A1 * | 10/2014 | Zhan .................... H04W 16/26 370/315 |
| 2015/0130667 | A1 * | 5/2015 | Koskiniemi ........... H01Q 1/526 343/702 |
| 2015/0311591 | A1 * | 10/2015 | Golombek ............. H01Q 1/48 343/848 |

OTHER PUBLICATIONS

Representative FCC Approval Documents (FCC Identifier RSNWF-HD) for Applicant Name Cellphone-Mate, made public Jul. 29, 2015, in 13 pages (available at World Wide Web page: transition.fcc.gov/oet/ea/fccid/).
SureCall Force-7 Industrial User Guide, Made Public Jul. 29, 2015, in 26 pages (available at World Wide Web page: transition.fcc.gov/oet/ea/fccid/).
CKC Laboratories, Inc., Radio Frequency Exposure Report, Report No. 96950-22, Issue Jun. 6, 2015, made public Jul. 29, 2015 in 9 pages (available at World Wide Web page: transition.fcc.gov/oet/ea/fccid/).
CKC Laboratories, Inc., Addendum EMC Test Report, Report No. 96950-13A, Issue Jul. 14, 2015, made public Jul. 29, 2015 in 217 pages (available at World Wide Web page: transition.fcc.gov/oet/ea/fccid/).
CKC Laboratories, Inc., EMC Test Report, Report No. 96950-14, Issue Jul. 6, 2015, made public Jul. 29, 2015 in 93 pages (available at World Wide Web page: transition.fcc.gov/oet/ea/fccid/).
CKC Laboratories, Inc., EMC Test Report, Report No. 96950-15, Issue Jul. 6, 2015, made public Jul. 29, 2015 in 70 pages (available at World Wide Web page: transition.fcc.gov/oet/ea/fccid/).
CKC Laboratories, Inc., EMC Test Report, Report No. 96950-16,Part 1, Issue Jul. 6, 2015, made public Jul. 29, 2015 in 115 pages (available at World Wide Web page: transition.fcc.gov/oet/ea/fccid/).
CKC Laboratories, Inc., EMC Test Report, Report No. 96950-16, Part 2, Issue Jul. 6, 2015, made public Jul. 29, 2015 in 86 pages (available at World Wide Web page: transition.fcc.gov/oet/ea/fccid/).
Cellphone-Mate Force-5 Manual, Apr. 30, 2012, in 36 pages (available at World Wide Web page: transition.fcc.gov/oet/ea/fccid/).
Wilson Sleek 4G Signal Booster Installation Guide, Dec. 4, 2012, in 8 pages (available at World Wide Web page wilsonelectronics.com).
Wilson AG ProTM Quint Selectable Signal Booster Installation Guide, Sep. 12, 2012 in 16 pages (available at World Wide Web page wilsonelectronics.com).
International Search Report and Written Opinion mailed Jun. 3, 2016 in International Application No. PCT/US2015/067898 (21 pages).
IEEE Antennas and Wireless Propagation Letters, vol. 4, 2005, Cavity-Backed Slot Antenna Array for the Repeater System of a Satellite Digital Multimedia Broadcasting Service.†
zBoost-One YX400-P Signal Booster, Jul. 5, 2014 https://web.archive.org/web/20140705092719/http://www.zboost.com/files/YX400-P_SpecSheet.pdf.†
Hindawi Publishing CorporationInternational Journal of Antennas and Propagation vol. 2012, Article ID 307616, 7 pages.†

\* cited by examiner
† cited by third party

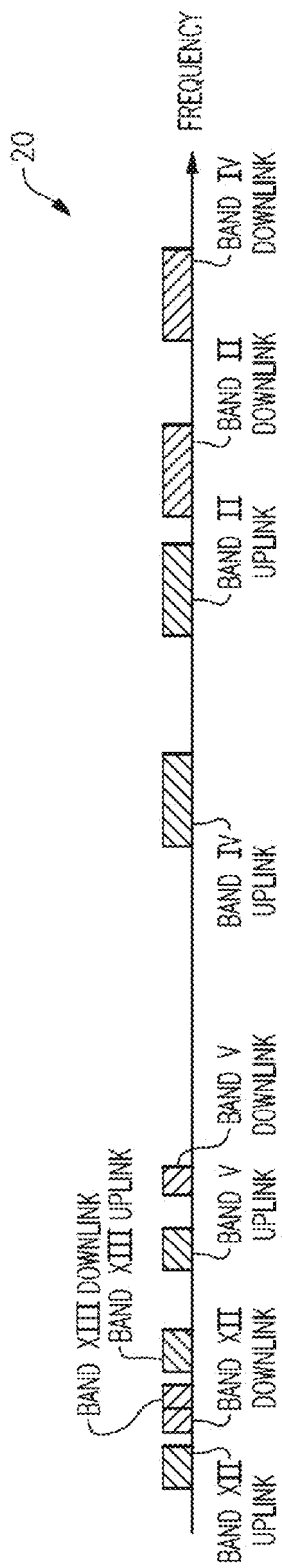
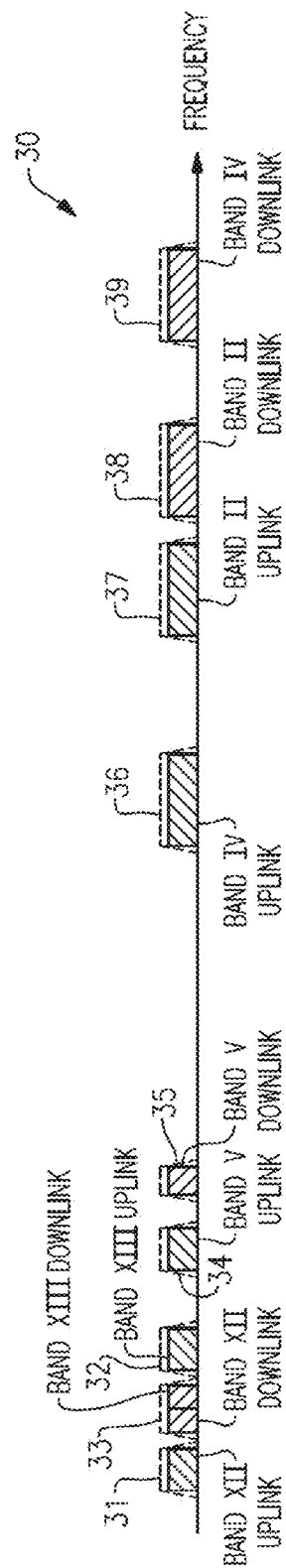
FIG. 2A
FIG. 2B

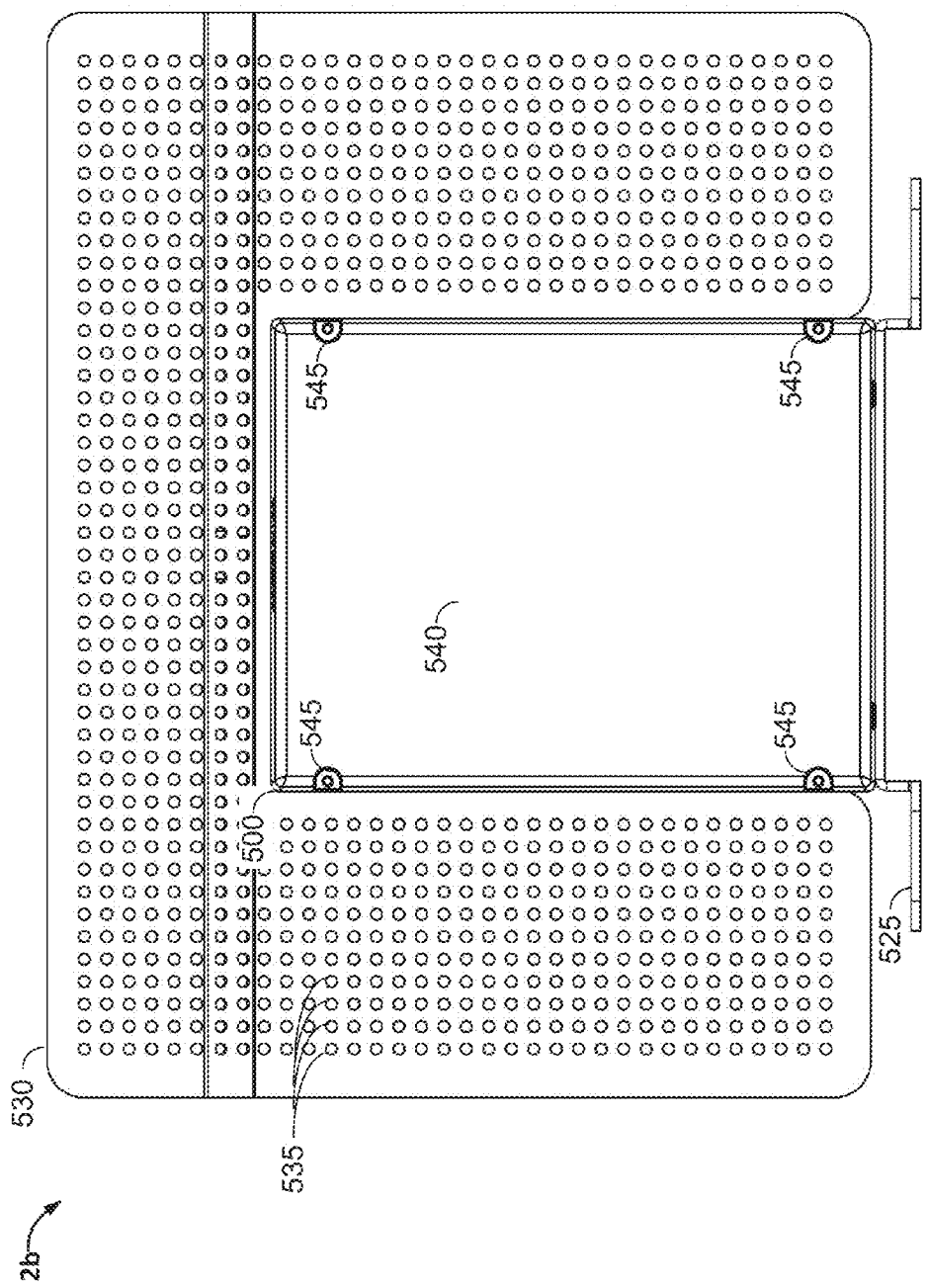

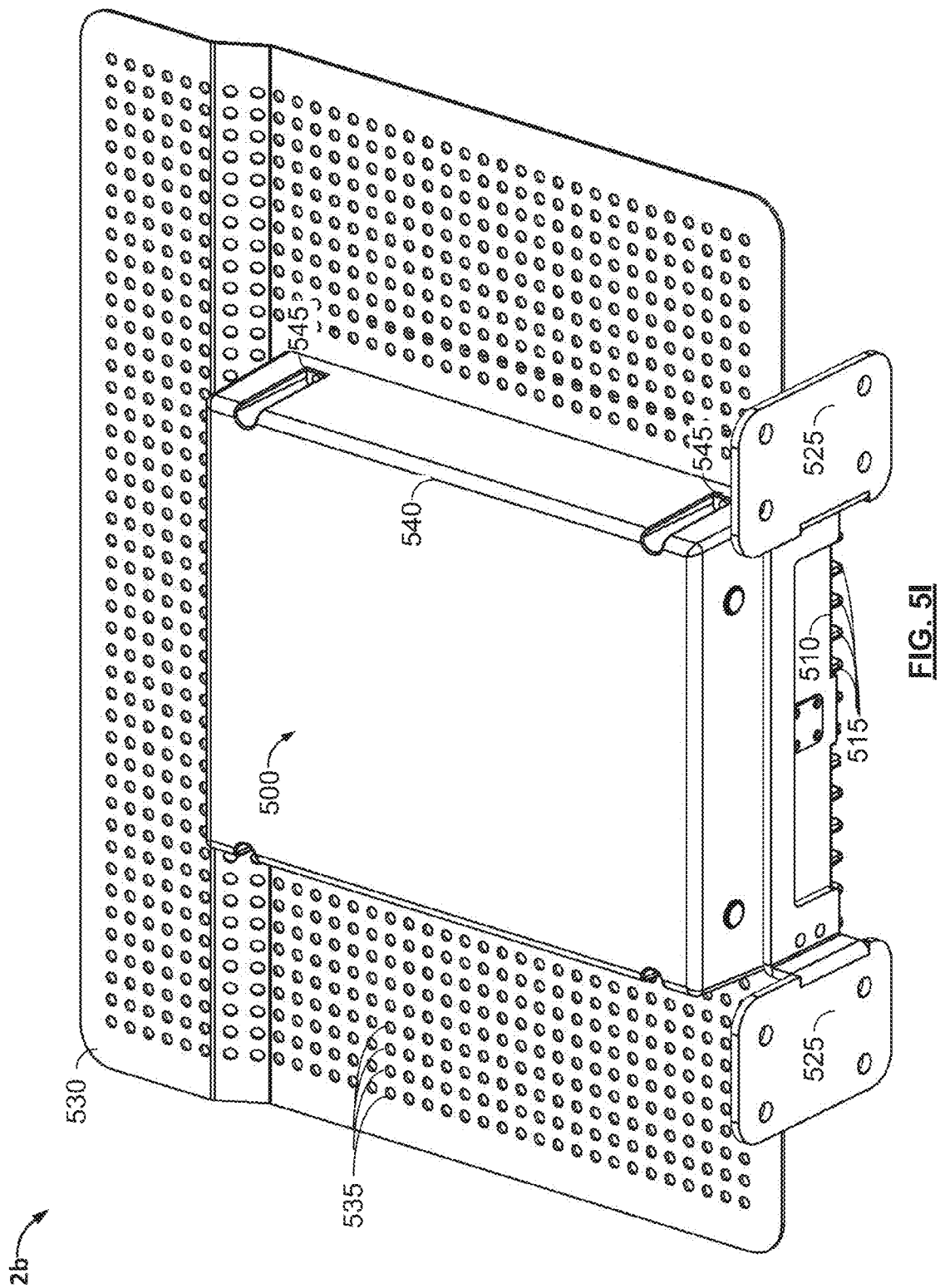

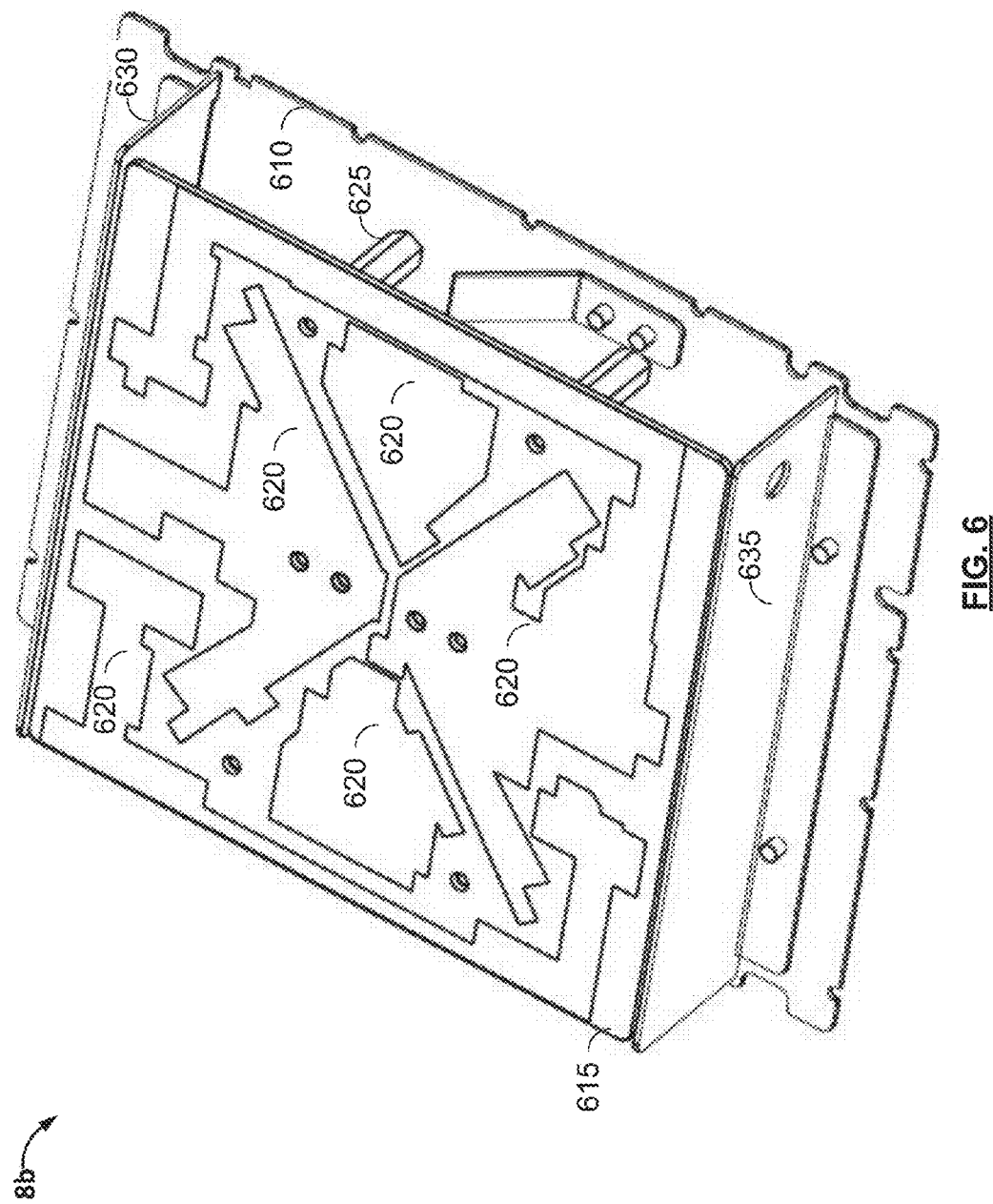

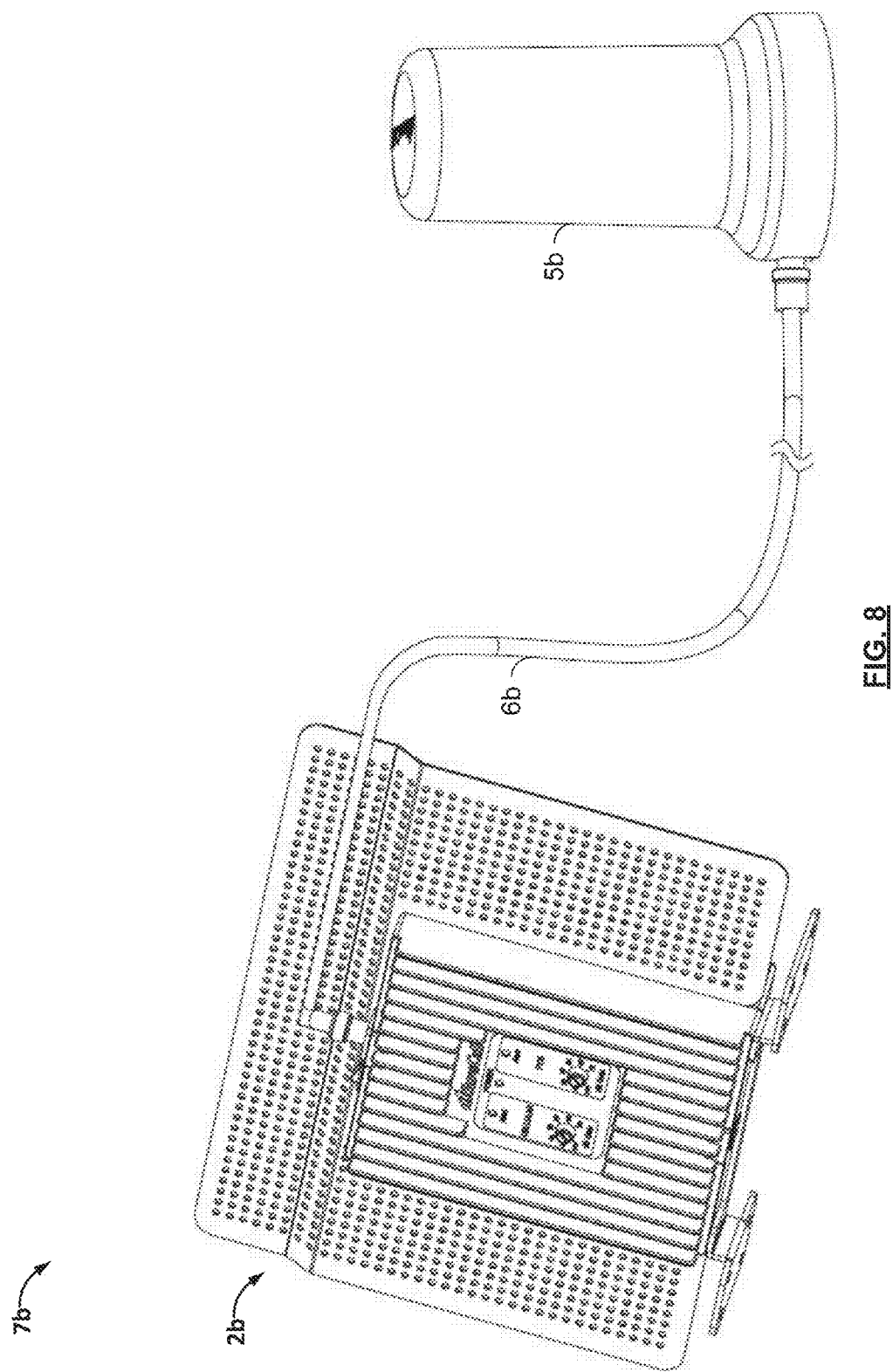

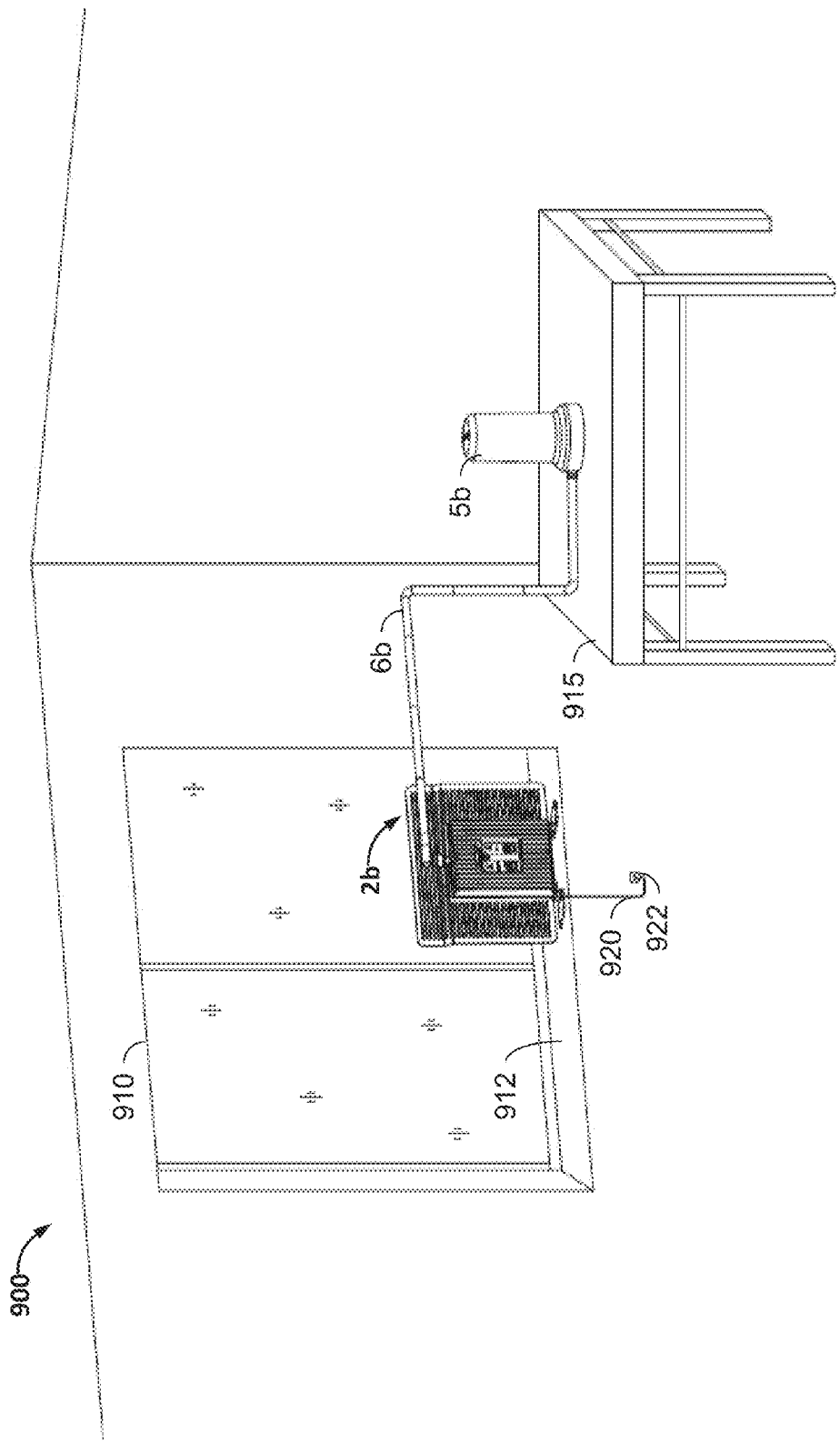

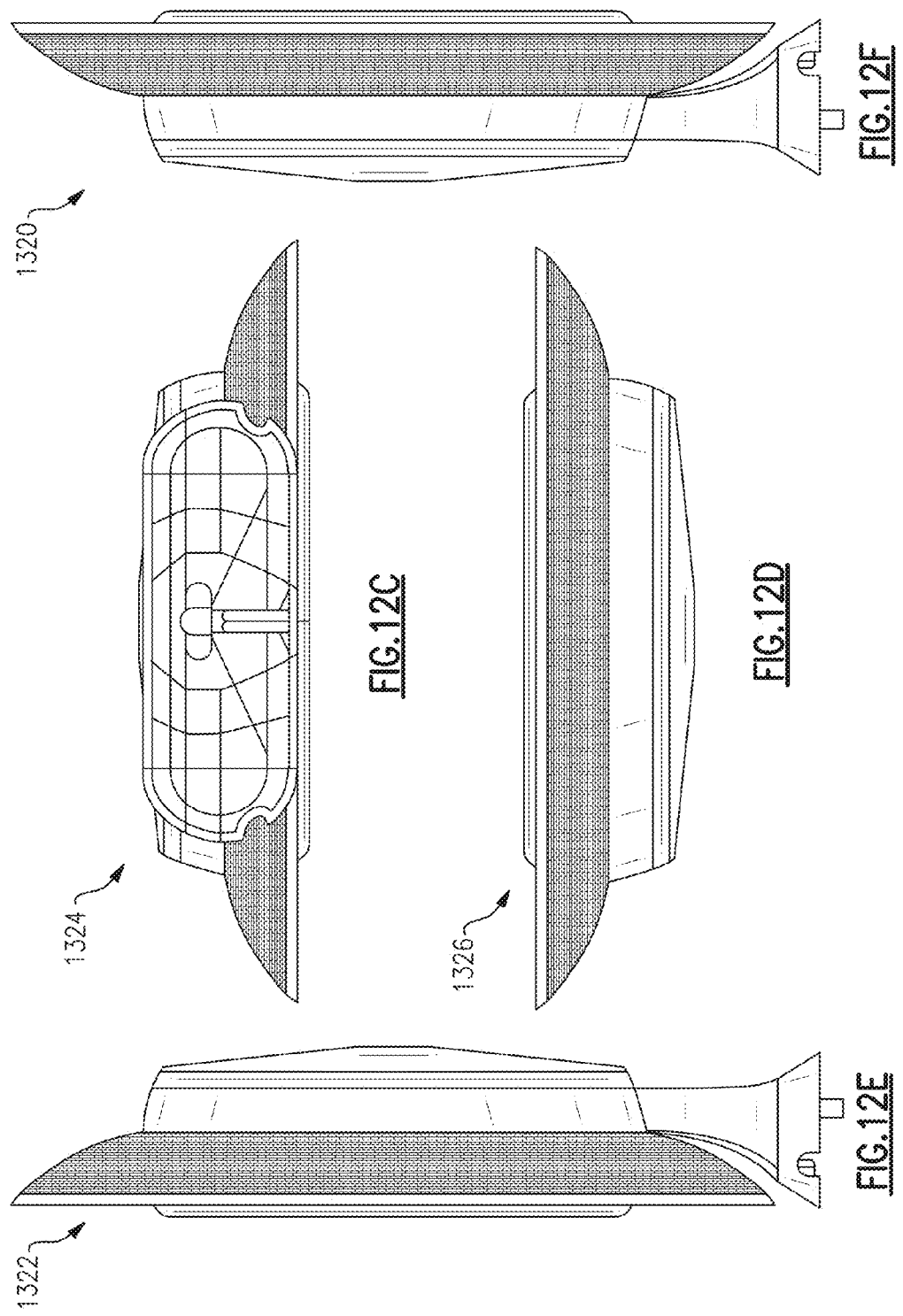

APPARATUS AND METHODS FOR RADIO FREQUENCY SIGNAL BOOSTERS

REFERENCE TO RELATED CASES

This application claims priority to U.S. Provisional Application No. 62/099,419, filed Jan. 2, 2015 and to U.S. Provisional Application No. 62/263,506, filed Dec. 4, 2015.

BACKGROUND

Field

Embodiments of the invention relate to electronic systems and, in particular, to radio frequency (RF) signal boosters.

Description of the Related Technology

A cellular or mobile network can include base stations for communicating with wireless devices located within the network's cells. For example, the base stations can transmit signals to wireless devices via a downlink channel and can receive signals from the wireless devices via an uplink channel. In the case of a network operating using frequency division duplexing (FDD), the downlink and uplink channels are separate in the frequency domain such that the frequency band operates using a pair of frequency channels.

A wireless device may be unable to communicate with any of the base stations when located in a portion of the mobile network having poor or weak signal strength. For example, the wireless device may be unable to communicate with a particular base station when the wireless device and the base station are separated by a large distance. Additionally, structures such as buildings or mountains can interfere with the transmission and/or reception of signals sent between the wireless device and a base station.

To improve the network's signal strength and/or the network's coverage, a radio frequency (RF) signal booster or repeater can be used to amplify signals in the network. For example, the signal booster can be used to amplify or boost signals having frequencies associated with the frequency ranges of the network's uplink and downlink channels. In certain configurations, a signal booster can be used to provide network coverage inside of a structure, such as a home or building. However, other configurations are possible, such as implementations in which the signal booster is used to provide coverage to remote network areas or in which the signal booster is coupled to a vehicle such as an automobile, bus, or train and used to boost network signals as the vehicle's position changes over time.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and mobile stations in a wireless network.

One innovative aspect of the present disclosure provides a radio frequency signal booster. The booster includes a housing, a first base station antenna integrated with the housing, a mobile base station antenna port, a downlink amplifier within the housing, and an uplink amplifier within the housing. The first base station antenna is configured to receive wireless communications signals on one or more downlink channels and to transmit wireless communications signals on one or more uplink channels. The mobile station antenna port is configured to provide communications signals on one or more downlink channels and to receive wireless communications signals on one or more uplink channels. The downlink amplifier is configured to amplify signals on downlink channels, received at the first base station antenna, for transmission through the mobile station antenna port. The uplink amplifier is configured to amplify signals on uplink channels, received at the mobile station antenna port, for transmission from the first base station antenna.

In various embodiments, the radio frequency signal booster can further include an isolator connected to and extending beyond the housing. The isolator can be configured to at least partially isolate the mobile station antenna from the first base station antenna. The isolator can be a reflector, which can include a plurality of perforations or be solid, can be flat or have bends or curved surfaces. In various embodiments, the reflector can comprise a circular and concave outer mesh configured to reduce feedback between the base station antenna and the mobile station antenna port.

In various embodiments, the radio frequency signal booster can further include a heat sink between the reflector and electronics within the housing. In other embodiments, the reflector can serve as the heat sink.

In various embodiments of the radio frequency signal booster, the housing can comprise a first cover and a second cover. The uplink and downlink amplifiers can be positioned within a cavity of the first cover. Also, the first base station antenna can be positioned within a cavity of the second cover.

In various embodiments, the first base station antenna can include a directional antenna including a printed circuit board including one or more antenna traces, and a shield configured to reflect signals radiated from the antenna traces. The material of the second cover can comprise plastic.

In various embodiments, the radio frequency signal booster can further include a second base station antenna. The first base station antenna can be configured to transmit and receive only on frequencies greater than a threshold frequency. The second base station antenna can be configured to transmit and receive only on frequencies less than or equal to the threshold frequency.

In various embodiments, the radio frequency signal booster can further include a second base station antenna. The first base station antenna can be configured to transmit signals only on uplink channels. The second base station antenna can be configured to receive signals only on downlink channels.

In various embodiments the radio frequency signal booster can further comprise a mounting bracket connected to a side of the housing.

In various embodiments, the radio frequency signal booster can further include a signal processor. The signal processor can perform digital interference cancellation only for signals below a threshold frequency, and the threshold frequency can be less than a frequency of at least one uplink or downlink channel.

In various embodiments, the radio frequency signal booster can further comprise a router. The router can comprise a WiFi router configured to access network data from a cable. Additionally, the router can comprise a cellular data router configured to receive cellular data via the base station antenna and to provide a WiFi signal via the mobile station antenna port.

In various embodiments, the radio frequency signal booster can further comprise a base stand.

In various embodiments, the radio frequency signal booster can further comprise at least one light emitting diode configured to indicate a system state. The system state can include at least one of the following: a power-good state indicative of whether or not power is sufficient for operation, a signal-strength state indicative of whether or not an external signal has sufficient strength for reception, and an antenna-position state indicative of whether or not a distance between a mobile station antenna connected to the mobile station antenna port and the first base station antenna is sufficient.

In various embodiments, the radio frequency signal booster can further comprise a gain control circuit. The gain control circuit can automatically adjust a gain of the downlink amplifier and/or the uplink amplifier according to a distance between a mobile station antenna connected to the mobile station antenna port and the signal booster.

Another innovative aspect of the present disclosure provides a radio frequency signal booster. The booster includes a housing, a base station antenna integrated with the housing, a mobile station antenna, a downlink amplifier within the housing, an uplink amplifier within the housing. The base station antenna is configured to receive wireless communications signals on one or more downlink channels and to transmit wireless communications signals on one or more uplink channels. The mobile station antenna is configured to transmit communications signals on one or more downlink channels and to receive wireless communications signals on one or more uplink channels. The downlink amplifier is configured to amplify signals on downlink channels, received at the base station antenna, for transmission through the mobile station antenna. The uplink amplifier is configured to amplify signals on uplink channels, received at the mobile station antenna, for transmission from the base station antenna.

In various embodiments, the radio frequency signal booster can further comprise a gain control circuit. The gain control circuit can automatically adjust a gain of the downlink amplifier and/or the uplink amplifier according to a distance between the mobile station antenna and the signal booster.

In various embodiments, the radio frequency signal booster can further comprise a reflector. The reflector can connect to and extend beyond the housing; and the reflector can at isolate the mobile station antenna from the base station antenna. The booster can also serve as a heat sink for electronics within the housing.

In various embodiments, the radio frequency signal booster can further comprise a reflector. The reflector can isolate the mobile station antenna from the first base station antenna. The booster can also include a heat sink between the reflector and electronics within the housing.

BRIEF DESCRIPTION OF THE DRAWINGS

FIG. 2A is a schematic diagram of one example of a portion of a frequency spectrum.

FIG. 2B is schematic diagram of the frequency spectrum of FIG. 2A with annotations showing frequency locations of band-pass filter passbands according to one embodiment.

FIG. 5B is a rear view of the signal booster of FIG. 1B.

FIG. 5I is a rear perspective view of the signal booster of FIG. 1B.

FIG. 6 is a perspective view of a base station antenna of FIG. 1B.

FIG. 8 illustrates a signal booster system of FIG. 1B, according to an example embodiment.

FIG. 9 illustrates an example configuration of the signal booster of FIG. 1B, according to one embodiment.

FIGS. 12C-12F show a right side section, a left side section, a bottom section, and a top section of the radio frequency signal booster of FIGS. 12A-12B.

DETAILED DESCRIPTION OF EMBODIMENTS

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1A:
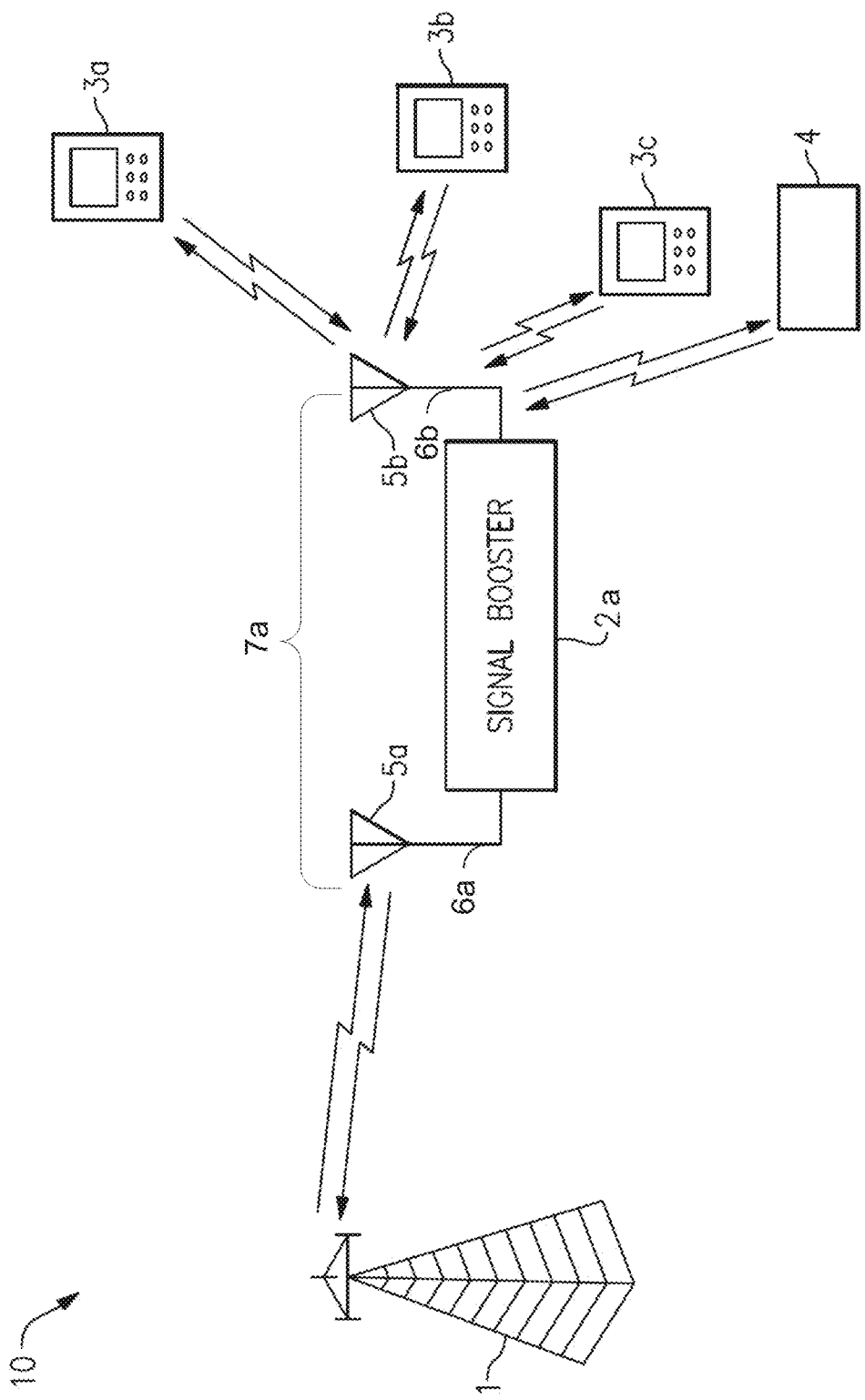
FIG. 1A is a schematic block diagram of a mobile network, according to one embodiment.

FIG. 1A is a schematic block diagram of a mobile network 10, according to one embodiment. The mobile network 10 includes a base station 1, a signal booster 2a, a plurality of mobile devices 3a-3c (three shown), and a network device 4.

The signal booster 2a is electrically coupled to a first antenna 5a and to a second antenna 5b. The signal booster 2a can retransmit signals to and receive signals from the base station 1 using the first antenna 5a, and can retransmit signals to and receive signals from the plurality of mobile devices 3a-3c and/or the network device 4 using the second antenna 5b. For example, the signal booster 2a can retransmit signals to the base station 1 over one or more uplink channels, and can receive signals from the base station 1 over one or more downlink channels. Additionally, the signal booster 2a can retransmit signals to the plurality of mobiles devices 3a-3c and/or the network device 4 over one or more downlink channels, and can receive signals from the devices over one or more uplink channels. In one embodiment, the first antenna 5a is an outdoor antenna positioned external to a structure such as a home or building and the second antenna 5b is an indoor antenna positioned within the structure. However, other configurations are possible. While illustrated with a common housing for a booster to boost signals of all frequency bands of interest, the teachings herein are applicable to configurations in which the signal booster 2a is implemented in multiples boxes or housings that communicate with one another, such as over a wireless communication channel at a different frequency than the frequency bands that the signal booster 2a boosts signals of.

Although FIG. 1A illustrates the signal booster 2a as communicating with one base station 1, the signal booster 2a typically communicates with multiple base stations. For example, the signal booster 2a can be used to communicate with base stations associated with different cells of a network. Furthermore, in certain implementations, the signal booster 2a can communicate with base stations associated with different networks, including, for example, networks associated with different wireless carriers and/or networks associated with different RF frequencies or bands.

For example, the mobile devices 3a-3c and/or the network device 4 can communicate at least in part over multiple frequency bands, including one or more cellular bands such as, for example, Universal Mobile Telecommunications System (UMTS) where UMTS refers to 3G bands, and such as Band II, Band IV, Band V, Band XII, and/or Band XIII. For instance, in one example, the first mobile device 3a can operate using Advanced Wireless Services (AWS) (Band IV), the second mobile device 3b can operate using Personal Communication Services (PCS) (Band II), and the third mobile device 3c can operate using Cellular (for example, 800 MHz in the U.S.) services (Band V). Furthermore, in certain configurations, all or a subset of the mobile devices 3a-3c and/or the network device 4 can communicate using Long Term Evolution (LTE), and may transmit and receive Band XII signals, Band XIII signals, and/or signals associated with other LTE bands. Although specific examples of frequency bands and communication technologies have been described above, the teachings herein are applicable to a wide range of frequency bands and communications standards including, in some embodiments, Wi-Fi bands (for example, according to Institute of Electrical and Electronics Engineers 802.11 wireless communication standards), and digital television bands (for example, according to Digital Video Broadcasting, Advanced Television System Committee, Integrated Services Digital Broadcasting, Digital Terrestrial Multimedia Broadcasting, and Digital Multimedia Broadcasting standards).

Accordingly, the signal booster 2a can be configured to boost signals associated with multiple frequency bands so as to improve network reception for each of the mobile devices 3a-3c and the network device 4. Configuring the signal booster 2a to service multiple frequency bands can improve network signal strength for multiple devices. For example, the signal booster 2a can improve network signal strength of devices using the same or different frequency bands, the same or different wireless carriers, and/or the same or different wireless technologies. Configuring the signal booster 2a as a multi-band repeater can avoid the cost of separate signal boosters for each specific frequency band and/or wireless carrier. Additionally, configuring the signal booster 2a as a multi-band repeater can also ease installation, reduce cabling, and/or issues associated with combining multiple repeaters.

The plurality of mobile devices 3a-3c can represent a wide range of mobile or portable communication devices, including, for example, multi-band mobile phones. The network device 4 can represent a wide range of other devices configured to communicate over one or more mobile networks, including, for example, computers, televisions, modems, routers, or other electronics. In one embodiment, the network device 4 is another signal booster. Although FIG. 1A illustrates the signal booster 2a as communicating with three mobile devices 3a-3c and one network device 4, the signal booster 2a can be used to communicate with more or fewer mobile devices and/or more or fewer network devices.

As shown in FIG. 1A, the first antenna 5a is connected to the signal booster 2a by an RF cable 6a. For example, the first antenna 5a, which can also be referred to as a base station antenna in various embodiments, can be mounted on the roof of a building or another location providing a relatively high signal strength to the base station 1. In some embodiments, the signal booster 2a can be located in an electrical closet inside a building. The signal booster 2a can be connected to the second antenna 5b by an RF cable 6b. The second antenna 5b, which can be also be referred to as a mobile station antenna in various embodiments, can be mounted within an occupied space of the building (for example, on an interior wall, table, or ceiling). Accordingly, there are five components to the illustrated booster system 7a: the first antenna 5a, the RF cable 6a, the signal booster 2a, the RF cable 6b, and the second antenna 5b. In some embodiments, for example as discussed below with respect to FIG. 1B, the booster system 7a can be simplified by integrating the first antenna 5a and the RF cable 6a with, e.g., into, the signal booster 2a.

Figure 1B:
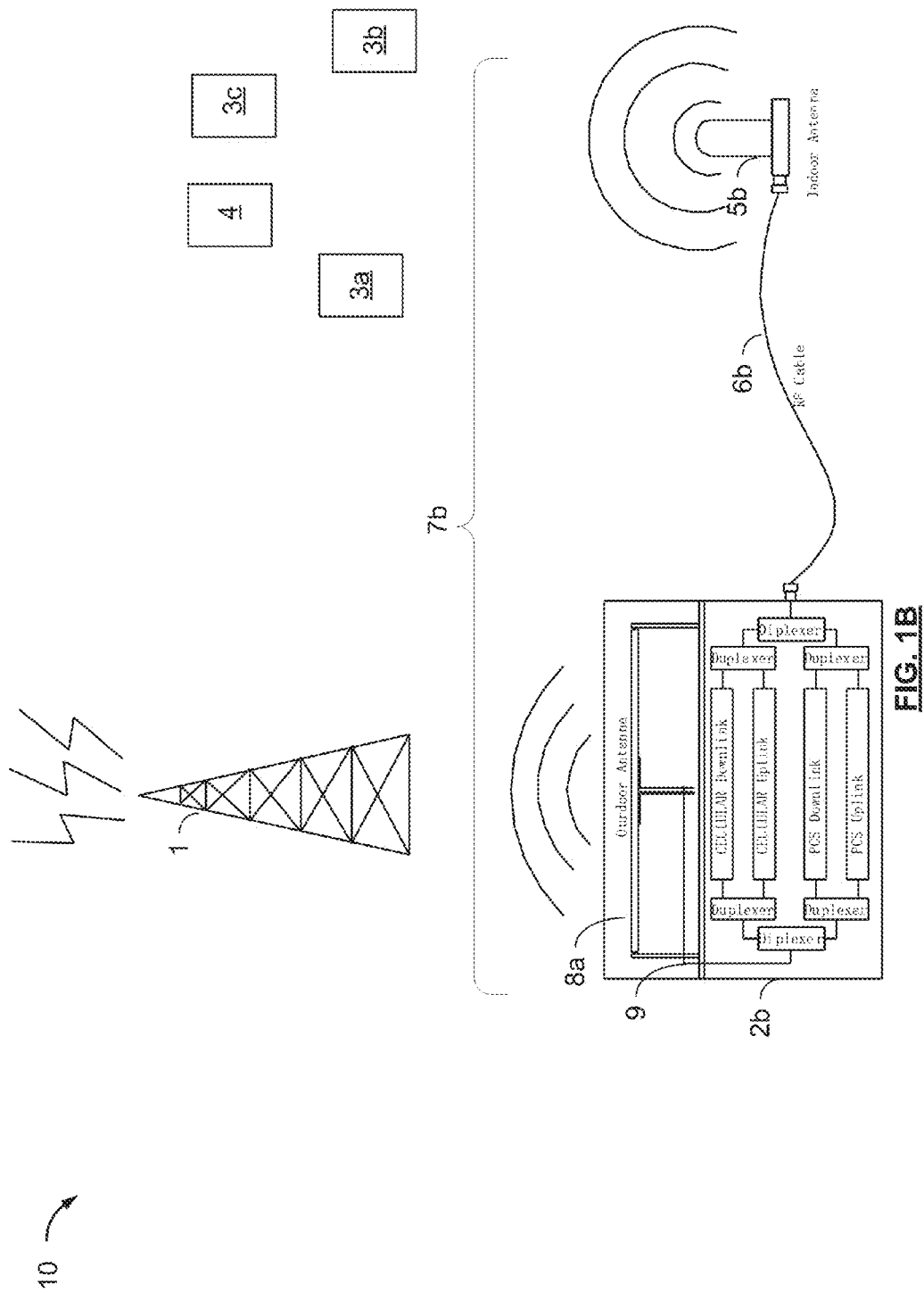
FIG. 1B is a schematic block diagram of the mobile network of FIG. 1A, according to another embodiment.

FIG. 1B is a schematic block diagram of the mobile network 10, according to another embodiment. The mobile network 10 includes the base station 1, a signal booster 2b, the plurality of mobile devices 3a-3c (three shown), and the network device 4.

The signal booster 2b, including electronics and housing, is integrated with a base station antenna 8a and is electrically coupled to the mobile station antenna 5b via the RF cable 6b. As used herein, a base station antenna is primarily configured for communication with a base station (such as the base station 1), as opposed to mobile devices (such as the mobile devices 3a-3c). For example, a base station antenna can be positioned for advantageous line-of-sight, signal strength, or directional gain with respect to one or more base stations 1. In one embodiment, the base station antenna 8a can be a directional antenna configured to primarily radiate out a window of a building. In contrast, a mobile station antenna can be primarily configured for communication with mobile devices (such as the mobile devices 3a-3c), as opposed to a base station (such as the base station 1). For example, a mobile station antenna can be positioned for advantageous line-of-sight, signal strength, or directional gain with respect to one or more mobile stations. In one embodiment, the mobile station antenna 5b can be an omnidirectional or directional antenna configured to primarily radiate within a building space.

Because the base station antenna 8a is integrated into the signal booster 2b, the base station antenna 8a can be electrically coupled to the signal booster 2b via a local RF cable 9. As compared to the remote RF cable 6a shown in FIG. 1A, the local RF cable 9 can be much shorter, thinner, smaller in diameter, fixed (not moving relative to the signal booster 2b), and more reliable, thereby decreasing signal degradation, improving sensitivity for reception of base station downlink signals, and providing known cable characteristics. In contrast, the remote RF cable 6a shown in FIG. 1A can be, for example, tens or hundreds of feet long, introducing for example 4-7 dB signal attenuation, and increasing installation costs (for example, drilling holes through a roof or wall, etc.).

As with the signal booster 2a, discussed above with respect to FIG. 1A, the signal booster 2b can retransmit signals to and receive signals from the base station 1 using the base station antenna 8a, and can retransmit signals to and receive signals from the plurality of mobile devices 3a-3c and/or the network device 4 using the mobile station antenna 5b. In particular, the signal booster 2b can be configured to receive downlink signals from one or more base stations, on one or more downlink channels, via the base station antenna 8a. The signal booster 2b can be configured to retransmit the downlink signals to one or more mobile devices, over the one or more downlink channels, via the mobile station antenna 5b. Similarly, the signal booster 2b can be configured to receive signals from the devices, over one or more uplink channels, via the mobile station antenna 5b. The signal booster 2b can be configured to retransmit the uplink signals to one or more base stations, over the one or more uplink channels, via the base station antenna 8a.

Integration of the base station antenna 8a into the signal booster 2b provides several heretofore unrecognized advantages over the inverse configuration (integration of the mobile station antenna 5b into the signal booster 2b). For example, received power at the base station antenna 8a (from the base station 1) can be much lower than received power at the mobile station antenna 5b (from the mobile stations 3a-3c). Accordingly, reception through the base station antenna 8a is more sensitive to signal attenuation than reception through the mobile station antenna 5b. Integration of the base station antenna 8a into the signal booster 2b can reduce signal attenuation over the RF cable 9.

On the other hand, integration of the base station antenna 8a into the signal booster 2b can introduce unwanted effects in certain embodiments. For example, as discussed below with respect to FIGS. 5A-5J, integration of the base station antenna 8a into the signal booster 2b can increase proximity of the base station antenna 8a to the mobile station antenna 5b (for example, by locating both antennas 8a and 5b in the same room, on the same building floor, etc.), thereby creating unwanted feedback and/or interference effects in some configurations. In various embodiments discussed herein, the signal booster 2b can include various features to mitigate these effects.

Moreover, significant installation cost can be incurred in the remote RF cable 6a configuration of FIG. 1A. For example, routing the remote RF cable 6a through one or more floors of a building, to the roof, can be significantly more expensive than internally routing the RF cable 6b within the building. Integration of the base station antenna 8a into the signal booster 2b can reduce or eliminate such installation costs for the remote RF cable 6a, for example in configurations where the signal booster 2b is placed in a building window (see, for example, FIG. 9).

Similarly, integration of the base station antenna 8a into the signal booster 2b provides several advantages over a combined configuration (integration of both the base station antenna 8a and the mobile station antenna 5b into the signal booster 2b). For example, as discussed below with respect to FIGS. 5A-5J, integration of the base station antenna 8a into the signal booster 2b can increase proximity of the base station antenna 8a to the mobile station antenna 5b, creating unwanted feedback and/or interference effects. In various embodiments discussed herein, the signal booster 2b can include various features to mitigate these effects. However, integration of both the base station antenna 8a and the mobile station antenna 5b into the signal booster 2b can further exacerbate such unwanted effects, and in most (if not all) cases can reduce system-gain to the point where it is much less useful.

Although FIG. 1B illustrates the signal booster 2b communicating with one base station 1, the signal booster 2b typically communicates with multiple base stations. For example, the signal booster 2b can be used to communicate with base stations associated with different cells of a network. Furthermore, in certain implementations, the signal booster 2b can communicate with base stations associated with different networks, including, for example, networks associated with different wireless carriers and/or networks associated with different RF frequencies or bands (such as any of the bands discussed above with respect to FIG. 1A). For example, the illustrated signal booster 2b includes two separate uplink/downlink paths: one for cellular bands and one for using Personal Communication Services (PCS)

bands. A person having ordinary skill in the art will appreciate that any combination of wireless communications bands can be included, although various novel approaches to combining certain specific wireless communications bands in the context of the booster system 7b are discussed herein, for example with respect to FIG. 2A, below.

FIG. 2A is a schematic diagram of one example of a portion of a frequency spectrum 20. The frequency spectrum 20 includes a Band XII uplink channel, a Band XII downlink channel, a Band XIII downlink channel, a Band XIII uplink channel, a Band V uplink channel, a Band V downlink channel, a Band IV uplink channel, a Band II uplink channel, a Band II downlink channel, and a Band IV downlink channel. The frequency spectrum 20 of FIG. 2A illustrates one example of the frequency bands that a signal booster described herein can be used for. However, other configurations are possible, such as implementations in which the signal booster amplifies signals of more or fewer frequency bands and/or a different combination of frequency bands.

In certain implementations, the Band XII uplink channel can have a frequency range of about 698 MHz to about 716 MHz, and the Band XII downlink channel can have a frequency range of about 728 MHz to about 746 MHz. Additionally, in certain implementations the Band XIII uplink channel can have a frequency range of about 776 MHz to about 787 MHz, and the Band XIII downlink channel can have a frequency range of about 746 MHz to about 757 MHz. Furthermore, in certain implementations the Band V uplink channel can have a frequency range of about 824 MHz to about 849 MHz, and the Band V downlink channel can have a frequency range of about 869 MHz to about 894 MHz. Additionally, in certain implementations the Band IV uplink channel can have a frequency range of about 1710 MHz to about 1755 MHz, and the Band IV downlink channel can have a frequency range of about 2110 MHz to about 2155 MHz. Furthermore, in certain implementations the Band XXV uplink channel can have a frequency range of about 1850 MHz to about 1915 MHz, and the Band XXV downlink channel can have a frequency range of about 1930 MHz to about 1995 MHz.

Although specific frequency ranges have been provided above, persons of ordinary skill in the art will appreciate that the frequencies of the bands can vary by geographical region and/or can change over time based on regulations set by governing agencies such as the Federal Communications Commission (FCC) or the Industry Canada (IC) or Canadian Radio-television and Telecommunications Commission (CRTC). Additionally, the teachings herein are applicable to configurations in which a signal booster provides amplification to signals of a portion of the sub-bands associated with one or more frequency bands. For example, certain frequency bands, including, for example, the PCS band, can be associated with a plurality of sub-bands, and the teachings herein are applicable to configurations in which the signal booster operates to provide boosting for signals of only some of the sub-bands.

Certain signal boosters can use a separate amplification path for each channel of each frequency band that the signal booster is used for. For example, each amplification path of the signal booster can include a band-pass filter having a passband for passing a particular uplink or downlink channel signal while attenuating or blocking signals of other frequencies. Configuring the signal booster in this manner can aid in maintaining the booster's compliance with communication standards and/or regulator rules, such as those limiting spurious and/or out-of-band emissions.

The radio frequency spectrum has become increasingly crowded with signals as mobile technologies have advanced and the demand for high speed wireless communication has expanded. For example, there has been an increase in a number and proximity of frequency bands that are being utilized by mobile devices and networks.

The increased crowding of the radio frequency spectrum has constrained the design and development of signal boosters, particular multi-band signal boosters that provide boosting across multiple frequency bands, including, for example, adjacent frequency bands. For example, a band-pass filter used to select a particular uplink or downlink channel for boosting can have a non-ideal passband associated with roll-off near the passband's edges. The filter's roll-off can lead to an increase in undesired spurious and/or out-of-band emissions associated with amplification of signals outside of the particular channel's frequency band. Although a particular uplink or downlink channel may be selected by using a relatively sharp filter such as a cavity filter, such filters can be prohibitive in cost and/or size.

Provided herein are apparatus and methods for RF signal boosters. In certain implementations, a multi-band signal booster is provided for boosting the signals of the uplink and downlink channels of at least a first frequency band and a second frequency band. The first and second frequency bands can be closely positioned in frequency, and the uplink channel of the first frequency band and the uplink channel of the second frequency band can be adjacent. Or, alternatively, the downlink channel of the first frequency band and the downlink channel of the second frequency band can be adjacent. For example, the duplex of the first and second frequency bands can be reversed such that the order in frequency of the first frequency band's uplink and downlink channels is flipped or reversed relative to the second frequency band's uplink and downlink channels.

In certain configurations, the downlink channels of the first and second channels are adjacent, and the signal booster includes a first amplification path for boosting the uplink channel signals of the first frequency band, a second amplification path for boosting the uplink channel signals of the second frequency band, and a third amplification path for boosting the downlink channel signals of the first and second frequency bands. For example, the first amplification path can include a first band-pass filter for passing the first frequency band's uplink channel signals and for attenuating signals of other frequencies such as the first frequency band's downlink channel signals, and the second amplification path can include a second band-pass filter for passing the second frequency band's uplink channel signals and for attenuating signals of other frequencies such as the second frequency band's downlink channel signals. Additionally, the third amplification path can include a third band-pass filter for passing the downlink channel signals of the first and second frequency bands and for attenuating signals of other frequencies such as the uplink channel signals of the first and second frequency bands. Thus, the signal booster can include a shared amplification path that operates to boost the signals on the downlink channels of adjacent frequency bands.

However, in other configurations, the uplink channels of the first and second channels are adjacent, and the signal booster includes a first amplification path for boosting the signals on the downlink channel of the first frequency band, a second amplification path for boosting the signals on the downlink channel of the second frequency band, and a third amplification path for boosting the signals on the uplink channels of the first and second frequency bands. In other arrangements, two amplification paths can be employed for boosting the signals on both uplink channels and both downlink channels of the first and second frequency bands.

The signal boosters described herein can be used to boost signals of multiple frequency bands, thereby improving signal strength for devices using different communications technologies and/or wireless carriers. Configuring the signal booster in this manner can avoid the cost of multiple signal boosters, such as having a specific signal booster for each frequency band. Additionally, the signal boosters can have reduced component count and/or size, since band-pass filters, amplifiers, attenuators and/or other circuitry can be shared for at least two channels. Furthermore, the signal boosters herein can be implemented without the cost of filters with relatively sharp passbands, such as cavity filters, which can have a high cost and/or occupy a large area. Thus, the signal boosters herein can be implemented using filters having a relatively low cost and/or a relatively small size, such as surface acoustic wave (SAW) filters and/or ceramic filters.

FIG. 2B is schematic diagram of the frequency spectrum of FIG. 2A with annotations showing frequency locations of band-pass filter passbands according to one embodiment.

In the illustrated configuration, a first band-pass filter passband 31 has been implemented to pass or select signals of a Band XII uplink channel, and a second band-pass filter passband 32 has been implemented to pass signals of a Band XIII uplink channel. Furthermore, a third band-pass filter passband 33 has been implemented to pass signals of both a Band XII downlink channel and a Band XIII downlink channel. Additionally, a fourth band-pass filter passband 34 has been implemented to pass signals of a Band V uplink channel, and a fifth band-pass filter passband 35 has been implemented to pass signals of a Band V downlink channel. Furthermore, a sixth band-pass filter passband 36 has been implemented to pass signals of a Band IV uplink channel, and a seventh band-pass filter passband 37 has been implemented to pass signals of a Band II uplink channel. Additionally, an eighth band-pass filter passband 38 has been implemented to pass signals of a Band II downlink channel, and a ninth band-pass filter passband 39 has been implemented to pass signals of a Band IV downlink channel. Although FIG. 2B illustrates a single passband for each frequency channel, a signal booster can include a plurality of band-pass filters that are cascaded, with or without intervening circuitry, to achieve an overall channel filtering.

As used herein, a band-pass filter can "pass" a particular frequency channel signal when the frequency channel is substantially within the band-pass filter's passband, even when the filter provides gain or loss in the passband. Accordingly, the teachings herein are not limited to band-pass filters having unity-gain passbands. Furthermore, in certain implementations, a band-pass filter herein can be implemented by cascading a low-pass filter and a high-pass filter. For example, cascading a high-pass filter having a cutoff frequency of $f_1$ and a low-pass filter having a cutoff frequency of $f_2$, where $f_2$ is greater than $f_1$, can operate to provide a band-pass filter having a passband between about $f_1$ and about $f_2$.

As shown in FIG. 2B, the third band-pass filter passband 33 advantageously passes the downlink channel signals of both Band XII and Band XIII, which are adjacent frequency bands. The illustrated configuration takes advantage of the reverse duplex of the Band XIII frequency band relative to that of the Band XII frequency band. For example, a typical frequency band, such as Band XIII, Band II, Band IV, and Band V, uses an uplink channel that is at a lower frequency than a corresponding downlink channel of the same band. However, Band XIII uses a reverse configuration in which the downlink channel is at a lower frequency relative to the uplink channel. Configuring a signal booster to have a band-pass filter that passes both the Band XII and Band XIII downlink signals can avoid a need for sharp band-pass filters for separately filtering the signals of the downlink bands, which can be difficult using relative small and/or low-cost filters such as SAW filters and/or ceramic filters, which can have a non-ideal passband and can provide insufficient channel filtering or selectivity.

Figure 3:
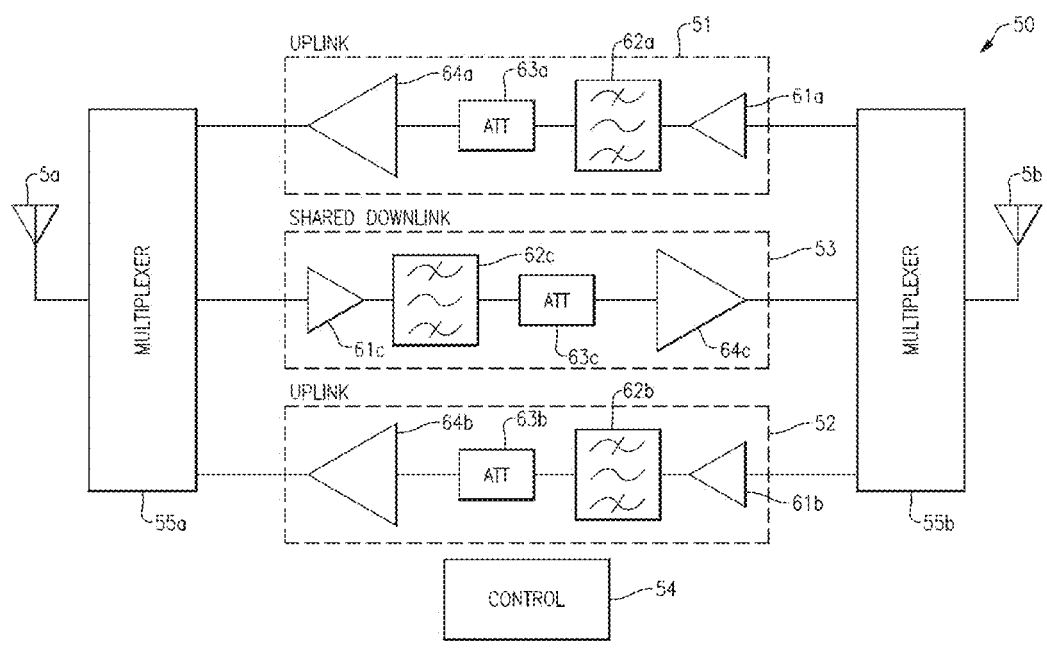
FIG. 3 is a schematic diagram of a signal booster for uplink and downlink channels for two bands according to one embodiment.

FIG. 3 is a schematic diagram of a signal booster 50 for uplink and downlink channels for two bands according to one embodiment. The signal booster 50 includes first and second multiplexers 55a, 55b, first to third amplification paths or circuits 51-53, and a control circuit 54. In the illustrated configuration, the signal booster 50 is electrically coupled to the first and second antennas 5a (or 8a in the case of FIG. 1B), 5b, such as by cables. However, other configurations are possible, including, for example, configurations in which one or both of the mobile station and base station antennas are integrated with a signal booster, particularly in view of the signal isolation between antennas as described herein.

The first multiplexer 55a includes a first terminal electrically connected to an output of the first amplification path 51, a second terminal electrically connected to an output of the second amplification path 52, a third terminal electrically connected to an input of the third amplification path 53, and an antenna terminal electrically connected to the first antenna 5a (or base station antenna 8a). The second multiplexer 55b includes a first terminal electrically connected to an input of the first amplification path 51, a second terminal electrically connected to an input of the second amplification path 52, a third terminal electrically connected to an output of the third amplification path 53, and an antenna terminal electrically connected to the second antenna 5b.

The first amplification path 51 includes a first low noise amplifier (LNA) 61a, a first band-pass filter 62a, a first attenuator 63a, and a first power amplifier (PA) 64a. The first LNA 61a, the first band-pass filter 62a, the first attenuator 63a, and the first PA 64a are cascaded with an input of the first LNA 61a operating as the first amplification path's input and with an output of the first PA 64a operating as the first amplification path's output. The second amplification path 52 includes a second LNA 61b, a second band-pass filter 62b, a second attenuator 63b, and a second PA 64b. The second LNA 61b, the second band-pass filter 62b, the second attenuator 63b, and the second PA 64b are cascaded with an input of the second LNA 61b operating as the second amplification path's input and with an output of the second PA 64b operating as the second amplification path's output. The third amplification path 53 includes a third LNA 61c, a third band-pass filter 62c, a third attenuator 63c, and a third PA 64c. The third LNA 61c, the third band-pass filter 62c, the third attenuator 63c, and the third PA 64c are cascaded with an input of the third LNA 61c operating as the third amplification path's input and with an output of the third PA 64c operating as the third amplification path's output.

In one embodiment, the gain of each of the first to third amplification paths 51-53 is selected to be in the range of about 10 dB to about 90 dB. In certain configurations, the gain of one or more of the first to third amplification paths 51-53 can be externally controlled, such as by using one or more switches and/or by using digital configuration. Although one example of gain values has been provided, other configurations are possible.

The first to third LNAs 61a-61c can provide low noise amplification for the first to third amplification paths 51-53, respectively. In certain implementations, the first to third LNAs 61a-61c can be used to amplify signals having a relatively small amplitude while adding or introducing a relatively small amount of noise. For example, in one embodiment, each of the LNAs 61a-61c has a noise figure of 1 dB or less. However, other configurations are possible.

The first to third band-pass filters 62a-62c include inputs electrically coupled to outputs of the first to third LNAs 61a-61c, respectively. The first to third band-pass filters 62a-62c can filter the frequency content of the amplified signals generated by the first to third LNAs 61a-61c, respectively. In certain embodiments, the first to third band-pass filters 62a-62c can be analog filters with fixed filtering characteristics and/or low costs, such as ceramic or SAW filters. However, other configurations are possible. Additional details of the first to third band-pass filters 62a-62c will be described further below.

The first to third attenuators 63a-63c can be used to attenuate the signals filtered by the first to third band-pass filters 62a-62c, respectively. The first to third attenuators 63a-63c can be used to limit a gain of the first to third amplification paths 51-53, respectively. For example, it can be desirable to provide attenuation in one or more of the first to third amplification paths 51-53, such as in configurations in which one or more of the input signals to the amplification paths have a relatively large amplitude, which can occur when the signal booster 50 is positioned relatively close to a base station. In one embodiment, the attenuation of the first to third attenuators 63a-63c can be controlled using one or more processing or control units. For example, one or more embedded CPUs can be used to provide gain control, such as programmable gain control. In certain implementations, the first to third attenuators 63a-63c can be implemented using analog attenuation components. However, other configurations are possible, such as implementations using digital attenuators, such as digital step attenuators.

The first to third PAs 64a-64c can be used to amplify the signals attenuated by the first to third attenuators 63a-63c, respectively. The first to third PAs 64a-64c can be used to provide amplified RF output signals that have a magnitude suitable for transmission via an antenna. The first to third PAs 64a-64c can be implemented using single or multi-stage configurations. For example, multi-stage configurations can be implemented with automatic gain control (AGC).

The control circuit 54 can be used to control the operation of the circuitry of the signal booster 50. For example, in certain implementations, the control circuit 54 can be used to control the level of attenuation of the first to third attenuators 63a-63c, an amount of gain of the first to third PAs 64a-64c and/or the first to third LNAs 61a-61c, and/or to provide other control operations in signal booster 50. For clarity of the figures, connections and control signals generated by the control circuit 54 have been omitted. Additionally, although not illustrated in FIG. 3, the signal booster 50 can include additional circuitry such as directional couplers, which can aid the control circuit 54 in controlling output power levels of the first to third amplification paths 51-53. Accordingly, in certain implementations the control circuit 54 can operate to provide automatic gain control (AGC). The control circuit 54 can also operate to provide other functionalities, including, for example, automatic oscillation detection and/or automatic shutdown to prevent interference with base stations.

The first and second multiplexers 55a, 55b can be used to provide multiplexing between the first to third amplification paths 51-53 and the first and second antennas 5a, 5b, respectively. For example, the first multiplexer 55a can be used to combine the amplified output signals from the first and second amplification paths 51, 52 for transmission via the first antenna 5a, and to filter a receive signal received on the first antenna 5a to provide an input signal to the third amplification path 53. Additionally, the second multiplexer 55b can be used to provide the amplified output signal from the third amplification path 53 to the second antenna 5b, and to filter a receive signal received on the second antenna 5b to provide appropriate input signals to the first and second amplification paths 51, 52.

In certain implementations, the first multiplexer 55a can include a band-pass filter associated with—one of the multiplexer's first to third terminals. Additionally, the second multiplexer 55b can include a band-pass filter associated with—one of the multiplexer's first to third terminals. The band-pass filter associated with a particular terminal can be configured to pass frequencies corresponding to those of an associated amplification path that is connected to the terminal. For example, in certain configurations, the band-pass filters of the multiplexers 55a, 55b have a passband similar to that of a corresponding one of the band-pass filters 62a-62c of the amplification paths 51-53. Furthermore, in certain implementations, one or both of the first and second multiplexers 55a, 55b can be omitted. For example, in one embodiment, the signal booster 50 omits the first and second multiplexers 55a, 55b in favor of using a separate antenna at the input and output of each of the amplification paths 51-53.

The signal booster 50 can be used to boost the signals on the uplink and downlink channels of first and second frequency bands that are adjacent or closely positioned in frequency, such as when adjacent frequency bands have a duplex that is reversed. For example, in one embodiment, the signal booster 50 is used to boost the signals of Band XII and Band XIII, which are adjacent in frequency and have uplink and downlink channels that are flipped or reversed in frequency such that the Band XII downlink channel and the Band XIII downlink channel are positioned between the Band XII uplink channel and the Band XIII uplink channel. For example, the Band XII downlink channel can have a greater frequency than the Band XII uplink channel, and the Band XIII uplink channel can have a greater frequency than the Band XIII downlink channel.

Additionally, the signal booster 50 includes the first and second amplification paths 51, 52, which can be used to amplify the signals on the uplink channels of the first and second bands. Furthermore, the signal booster 50 includes the third amplification path 53, which operates as a shared amplification path that boosts the signals on both the downlink channel of the first frequency band and the downlink channel of the second frequency band. Thus, in contrast to a conventional signal booster that includes a separate amplification path for each frequency channel on which the signals are boosted, the illustrated configuration includes a shared amplification path for amplifying the signals on adjacent downlink channels, such as close or abutting downlink channels. In other embodiments, the third amplification path 53 can be split into two separate amplification paths: one for the downlink channel of the first frequency band and another for the downlink channel of the second frequency band. In still other embodiments, two shared amplification paths can be employed for boosting signals on both uplink channels and both downlink channels of the first and second frequency bands.

To provide suitable channel filtering, the first band-pass filter 62a can pass the first frequency band's uplink channel signals and attenuate the first frequency band's downlink channel signals. Additionally, second band-pass filter 62b can pass the second frequency band's uplink channel and attenuate the second frequency band's downlink channel. Furthermore, the third band-pass filter 62c can pass the downlink channels of both the first and second frequency bands and attenuate the uplink channels of both the first and second frequency bands. Thus, the third amplification path 53 is shared between the downlink channels of the first and second frequency bands and operates to simultaneously boost or repeat the signals on the downlink channels. Since the third amplification path 53 boosts the signals on the downlink channels of both the first and second frequency bands, relatively sharp filters need not be used to separately filter these channels. Thus, the first to third band-pass filters 62a-62c can be implemented using filters having a relatively low cost and/or a relatively small size, such as surface acoustic wave (SAW) and/or ceramic filters.

Although the signal booster 50 has been described in the context of a single amplification path boosting multiple downlink channels, the teachings herein are applicable to configurations in which a single amplification path is used to boost the signals on multiple uplink channels. For example, the teachings herein are applicable to configurations in which a shared amplification path is used to boost the signals on the uplink channels of two frequency bands that are adjacent, such as when the duplex of the first and second frequency bands is reversed such that the bands' uplink channels are positioned between the bands' downlink channels.

In one embodiment, the adjacent uplink channels or the adjacent downlink channels of the first and second frequency bands are separated in frequency by less than about 10 MHz. Furthermore, in certain implementations, the adjacent uplink channels or the adjacent downlink channels of the first and second frequency bands are abutting, such that there is substantially no separation or gap (e.g., about 0 MHz) between the channel frequencies.

Although one implementation of a signal booster is illustrated in FIG. 3, other configurations are possible. For example, the signal booster can include more or fewer amplifications paths. Additionally, one or more of the amplification paths can be modified to include more or fewer components and/or a different arrangement of components. For example, in certain implementations, the order of a band-pass filter and an attenuator can be reversed in a cascade, the band-pass filters can be positioned before the LNAs in one or more of the cascades, and/or additional components can be inserted in the cascade.

Figure 4:
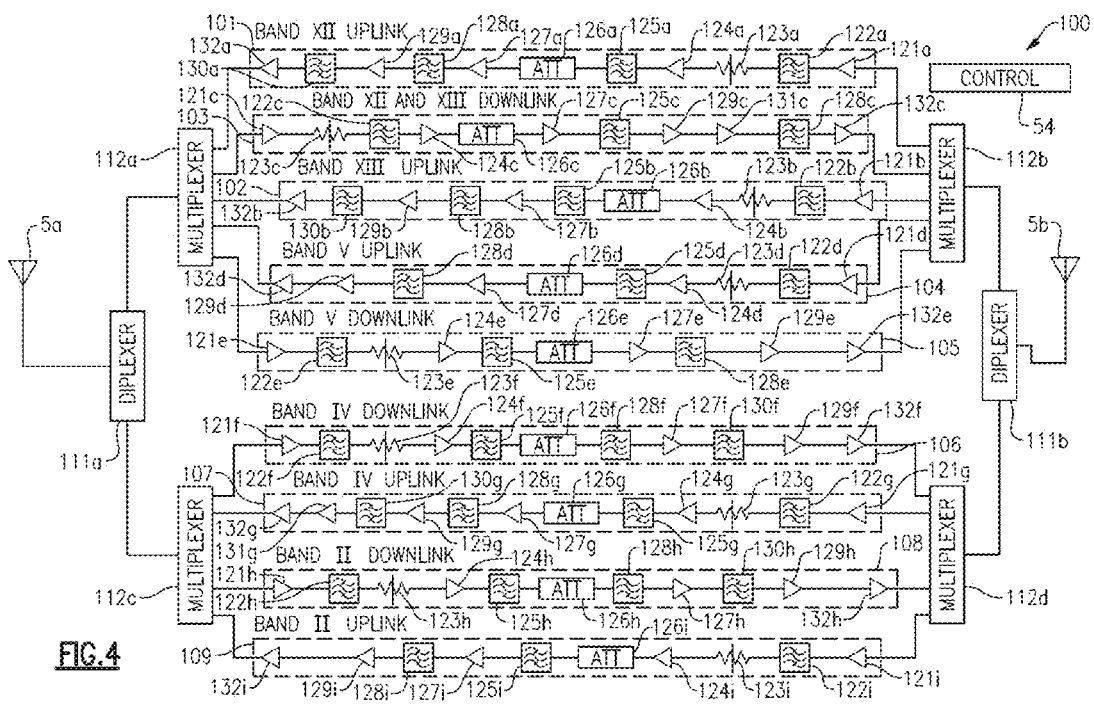
FIG. 4 is a schematic diagram of a signal booster for uplink and downlink channels for five bands according to another embodiment.

FIG. 4 is a schematic diagram of a signal booster 100 for uplink and downlink channels for five bands according to another embodiment. The signal booster 100 includes the control circuit 54, first to fourth multiplexers 112a-112d, first and second diplexers 111a, 111b, and first to ninth amplification paths or circuits 101-109. The signal booster 100 is electrically coupled to the first and second antennas 5a, 5b.

The first diplexer 111a includes an antenna terminal electrically connected to the first antenna 5a, a first terminal electrically connected to an antenna terminal of the first multiplexer 112a, and a second terminal electrically connected to an antenna terminal of the third multiplexer 112c. The second diplexer 111b includes an antenna terminal electrically connected to the second antenna 5b, a first terminal electrically connected to an antenna terminal of the second multiplexer 112b, and a second terminal electrically connected to an antenna terminal of the fourth multiplexer 112d.

The first multiplexer 112a further includes a first terminal electrically connected to an output of the first amplification path 101, a second terminal electrically connected to an output of the second amplification path 102, a third terminal electrically connected to an input of the third amplification path 103, a fourth terminal electrically connected to an output of the fourth amplification path 104, and a fifth terminal electrically connected to an input of the fifth amplification path 105. The second multiplexer 112b further includes a first terminal electrically connected to an input of the first amplification path 101, a second terminal electrically connected to an input of the second amplification path 102, a third terminal electrically connected to an output of the third amplification path 103, a fourth terminal electrically connected to an input of the fourth amplification path 104, and a fifth terminal electrically connected to an output of the fifth amplification path 105.

The third multiplexer 112c includes a first terminal electrically connected to an input of the sixth amplification path 106, a second terminal electrically connected to an output of the seventh amplification path 107, a third terminal electrically connected to an input of the eighth amplification path 108, and a fourth terminal electrically connected to an output of the ninth amplification path 109. The fourth multiplexer 112d includes a first terminal electrically connected to an output of the sixth amplification path 106, a second terminal electrically connected to an input of the seventh amplification path 107, a third terminal electrically connected to an output of the eighth amplification path 108, and a fourth terminal electrically connected to an input of the ninth amplification path 109.

In the illustrated configuration, the first amplification path 101 can provide amplification gain to a Band XII uplink channel, and the second amplification path 102 can provide amplification gain to a Band XIII uplink channel. Furthermore, the third amplification path 103 can provide amplification gain to both the Band XII and Band XIII downlink channels. Additionally, the fourth amplification path 104 can provide amplification gain to the Band V uplink channel, and the fifth amplification path 105 can provide amplification gain to the Band V downlink channel. Furthermore, the sixth amplification path 106 can provide amplification gain to the Band IV downlink channel, and the seventh amplification path 107 can provide amplification gain to the Band IV uplink channel. Additionally, the eighth amplification path 108 can provide amplification gain to the Band II downlink channel, and the ninth amplification path 109 can provide amplification gain to the Band II uplink channel.

The first and second multiplexers 112a, 112b can provide multiplexing operations for the first to fifth amplification paths 101-105. The first and second multiplexers 112a, 112b can include a band-pass filter for each of the multiplexers' first to fifth terminals. The band-pass filters can have passbands positioned at frequencies corresponding to the uplink or downlink channels of an associated amplification path. Additionally, the third and fourth multiplexers 112c, 112d can provide multiplexing operations for the sixth to ninth amplification paths 106-109. The third and fourth multiplexers 112c, 112d can include a band-pass filter for each of the multiplexers' first to fourth terminals. The band-pass filters can have passbands positioned at frequencies corresponding to the uplink or downlink channels of an associated amplification path.

The first diplexer 111a can be used to combine/split signals from/to the antenna terminals of the first and third multiplexers 112a, 112c, and can be used to combine/split signals to/from the first antenna 5a. Additionally, the second diplexer 111b can be used to combine/split signals from/to the antenna terminals of the second and fourth multiplexers 112b, 112d, and can be used to combine/split signals to/from the second antenna 5b. Including the first and second diplexers 111a, 111b in the signal booster 100 can aid the signal booster 100 in operating over disjoint frequency bands by combining signals separated by a relatively large frequency difference. For example, in the illustrated configuration, the first and second diplexers 111a, 111b have been used in combination with the multiplexers 112a-112d to multiplex Band XII, Band XIII, and Band V signals with Band II and Band IV signals.

Each of the first to ninth amplification paths 101-109 can include different combinations of components, such as amplifiers, attenuators, and band-pass filters, selected to achieve an overall amplification characteristic desirable for a particular band.

In the illustrated configuration, the first amplification path 101 includes a cascade of an LNA 121a, a first band-pass filter 122a, a power level control block or circuit 123a, a first intermediate amplifier or gain block 124a, a second band-pass filter 125a, an attenuator 126a, a second gain block 127a, a third band-pass filter 128a, a third gain block 129a, a fourth band-pass filter 130a, and a power amplifier 132a. Additionally, the second amplification path 102 includes a cascade of an LNA 121b, a first band-pass filter 122b, a power level control block 123b, a first gain block 124b, an attenuator 126b, a second band-pass filter 125b, a second gain block 127b, a third band-pass filter 128b, a third gain block 129b, a fourth band-pass filter 130b, and a power amplifier 132b. Furthermore, the third amplification path 103 includes a cascade of an LNA 121c, a power level control block 123c, a first band-pass filter 122c, a first gain block 124c, an attenuator 126c, a second gain block 127c, a second band-pass filter 125c, a third gain block 129c, a fourth gain block 131c, a third band-pass filter 128c, and a power amplifier 132c. Additionally, the fourth amplification path 104 includes a cascade of an LNA 121d, a first band-pass filter 122d, a power level control block 123d, a first gain block 124d, a second band-pass filter 125d, an attenuator 126d, a second gain block 127d, a third band-pass filter 128d, a third gain block 129d, and a power amplifier 132d. Furthermore, the fifth amplification path 105 includes a cascade of an LNA 121e, a first band-pass filter 122e, a power level control block 123e, a first gain block 124e, a second band-pass filter 125e, an attenuator 126e, a second gain block 127e, a third band-pass filter 128e, a third gain block 129e, and a power amplifier 132e.

Additionally, in the illustrated configuration, the sixth amplification path 106 includes a cascade of an LNA 121f, a first band-pass filter 122f, a power level control block 123f, a first gain block 124f, a second band-pass filter 125f, an attenuator 126f, a third band-pass filter 128f, a second gain block 127f, a fourth band-pass filter 130f, a third gain block 129f, and a power amplifier 132f. Furthermore, the seventh amplification path 107 includes a cascade of an LNA 121g, a first band-pass filter 122g, a power level control block 123g, a first gain block 124g, a second band-pass filter 125g, an attenuator 126g, a second gain block 127g, a third band-pass filter 128g, a third gain block 129g, a fourth band-pass filter 130g, a fourth gain block 131g, and a power amplifier 132g. Additionally, the eighth amplification path 108 includes a cascade of an LNA 121h, a first band-pass filter 122h, a power level control block 123h, a first gain block 124h, a second band-pass filter 125h, an attenuator 126h, a third band-pass filter 128h, a second gain block 127h, a fourth band-pass filter 130h, a third gain block 129h, and a power amplifier 132h. Furthermore, the ninth amplification path 109 includes a cascade of an LNA 121i, a first band-pass filter 122i, a power level control block 123i, a first gain block 124i, an attenuator 126i, a second band-pass filter 125i, a second gain block 127i, a third band-pass filter 128i, a third gain block 129i, and a power amplifier 132i.

The signal booster 100 of FIG. 4 is similar to the signal booster 50 of FIG. 3, except that the signal booster 100 of FIG. 4 has been expanded to boost signals of five frequency bands and has been adapted to include additional filters, amplifiers and other circuitry, such as additional components in cascades associated with the amplification paths. In the illustrated configuration, each of the amplification paths 101-109 includes an LNA, a power amplifier, an attenuator, and at least one band-pass filter. Additionally, as shown in FIG. 4, the connection between the amplifications paths 101-109 and the antennas 5a, 5b through the multiplexers 112a-112d and the diplexers 111a, 111b can be symmetric. For example, in the illustrated configuration, each of the amplification paths 101-109 is coupled to the antennas 5a, 5b through one multiplexer and one diplexer. Although configuring the signal booster 100 to be symmetric can reduce noise, other implementations are possible, including, for example, asymmetric configurations.

As shown in FIG. 4, a type, number, and/or order of the components in an amplification path can be selected to provide a desired amplification characteristic for a particular frequency channel. For example, a number of gain blocks can be selected to achieve a desired amplification characteristic for the channel(s), while a number of pass-band filters can be selected to achieve a desired filtering characteristic for the channel(s).

In certain configurations, the power level control blocks 123a-123i are included to adjust the gain of the first to ninth amplification paths 101-109, respectively. For example, in certain implementations, the power level control blocks 123a-123i can be used to adjust or limit the gain when the power level of an associated amplification path exceeds a maximum power threshold level. However, in other configurations, one or more of the power level control blocks 123a-123i can be omitted.

In the illustrated configuration, the signal booster 100 includes the third amplification path 103, which has been configured to boost signals on both a Band XII downlink channel and a Band XIII downlink channel. The third amplification path 103 includes first to third band-pass filters 122c, 125c, 128c, each of which can have a passband configured to pass signals on both the Band XII and Band XIII downlink channels while attenuating other frequency signals. Thus, in contrast to the signal booster 50 of FIG. 3 which includes one band-bass filter 62b in the third amplification path 53, the signal booster 100 illustrates a configuration using three band-pass filters 122c, 125c, 128c in the third amplification path 103. Using a plurality of band-pass filters in an amplification path can increase a strength or degree of filtering. For example, cascading multiple band-pass filters can be useful in high gain configurations, in which an amplification path has a relatively large amount of gain.

Although FIG. 4 illustrates one example of a signal booster in accordance with the teachings herein, other configurations are possible. For example, the teachings herein are applicable to configurations in which the signal booster 100 boosts signals of more or fewer bands, or a different combination of bands.

Figure 5A:
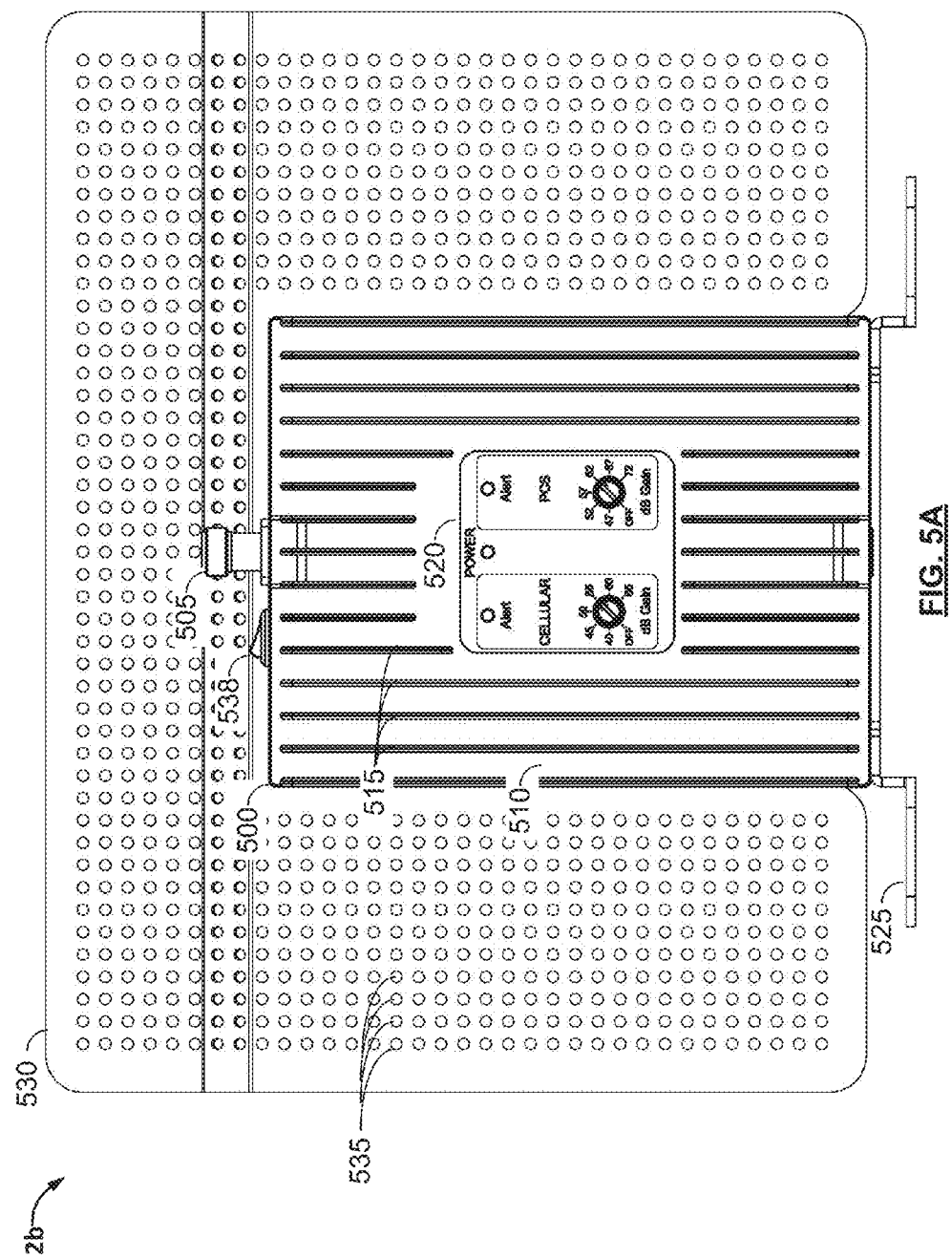
FIG. 5A is a front view of the signal booster of FIG. 1B.
Figure 5C:
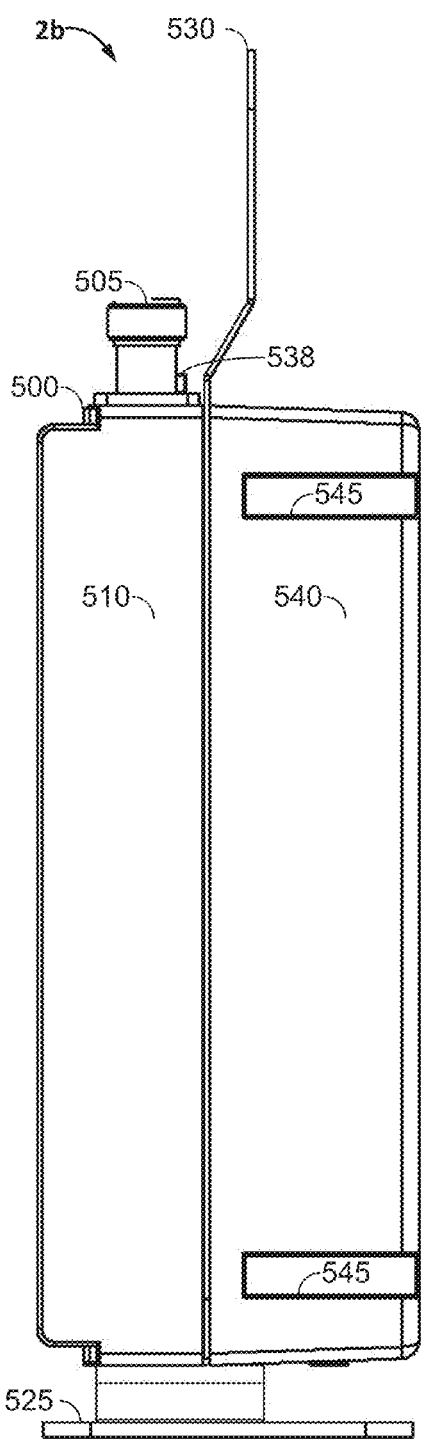
FIG. 5C is a right-side view of the signal booster of FIG. 1B.
Figure 5D:
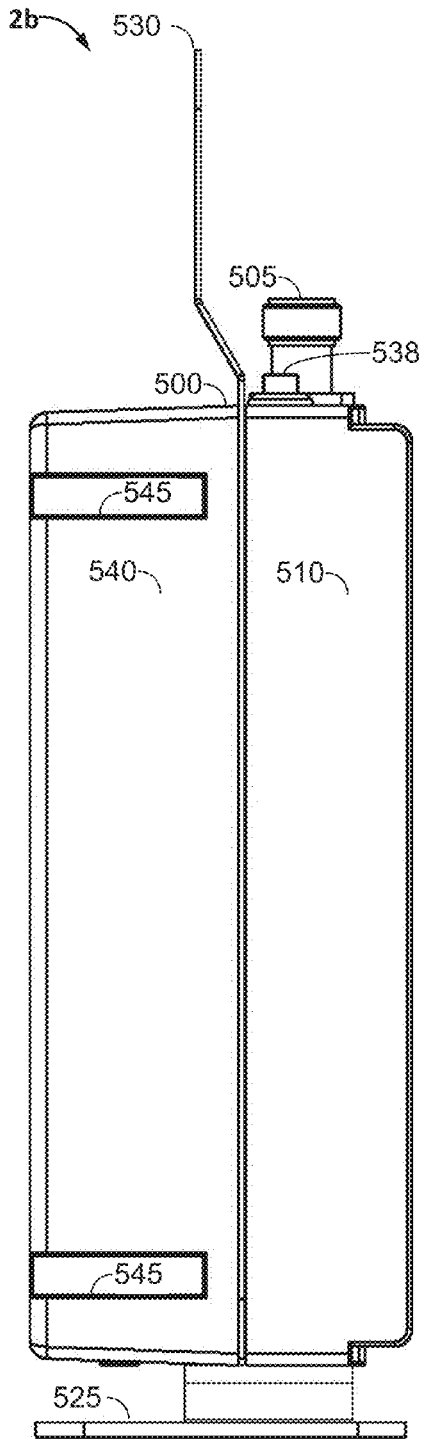
FIG. 5D is a left-side view of the signal booster of FIG. 1B.
Figure 5E:
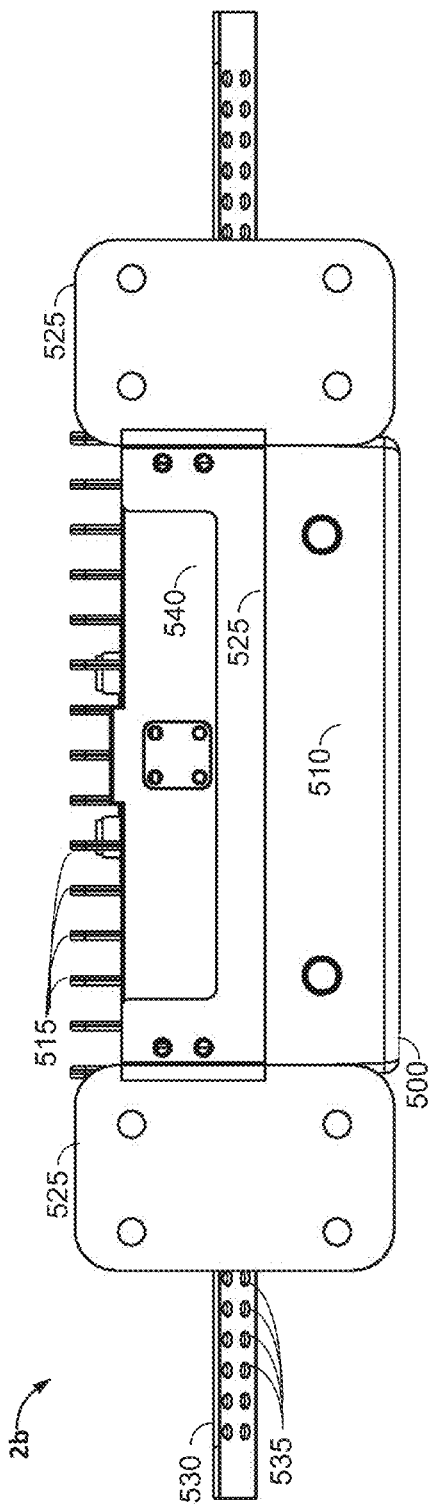
FIG. 5E is a bottom view of the signal booster of FIG. 1B.
Figure 5F:
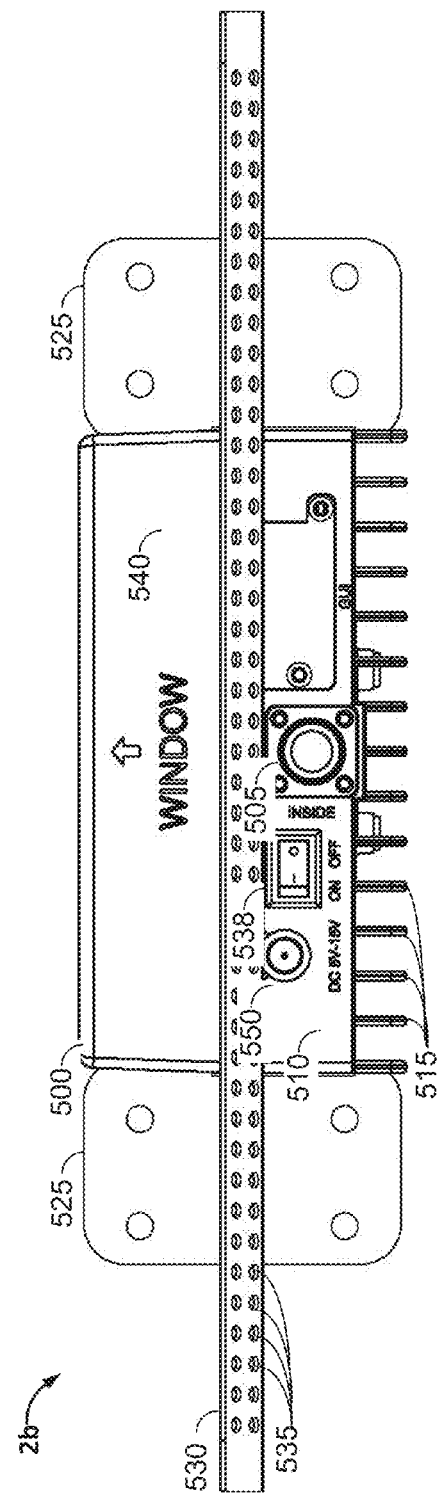
FIG. 5F is a top view of the signal booster of FIG. 1B.
Figure 5G:
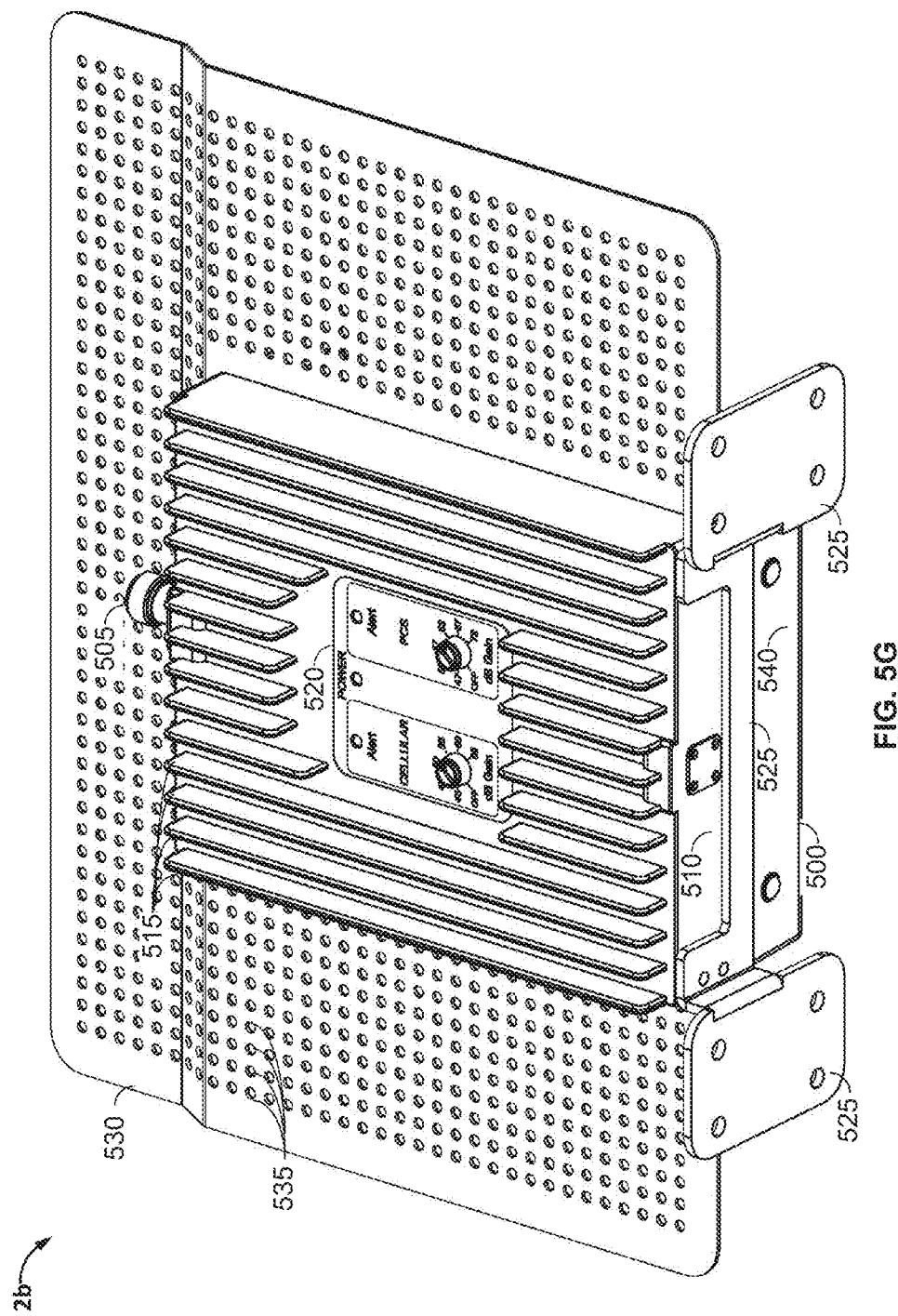
FIG. 5G is a front perspective view of the signal booster of FIG. 1B.
Figure 5H:
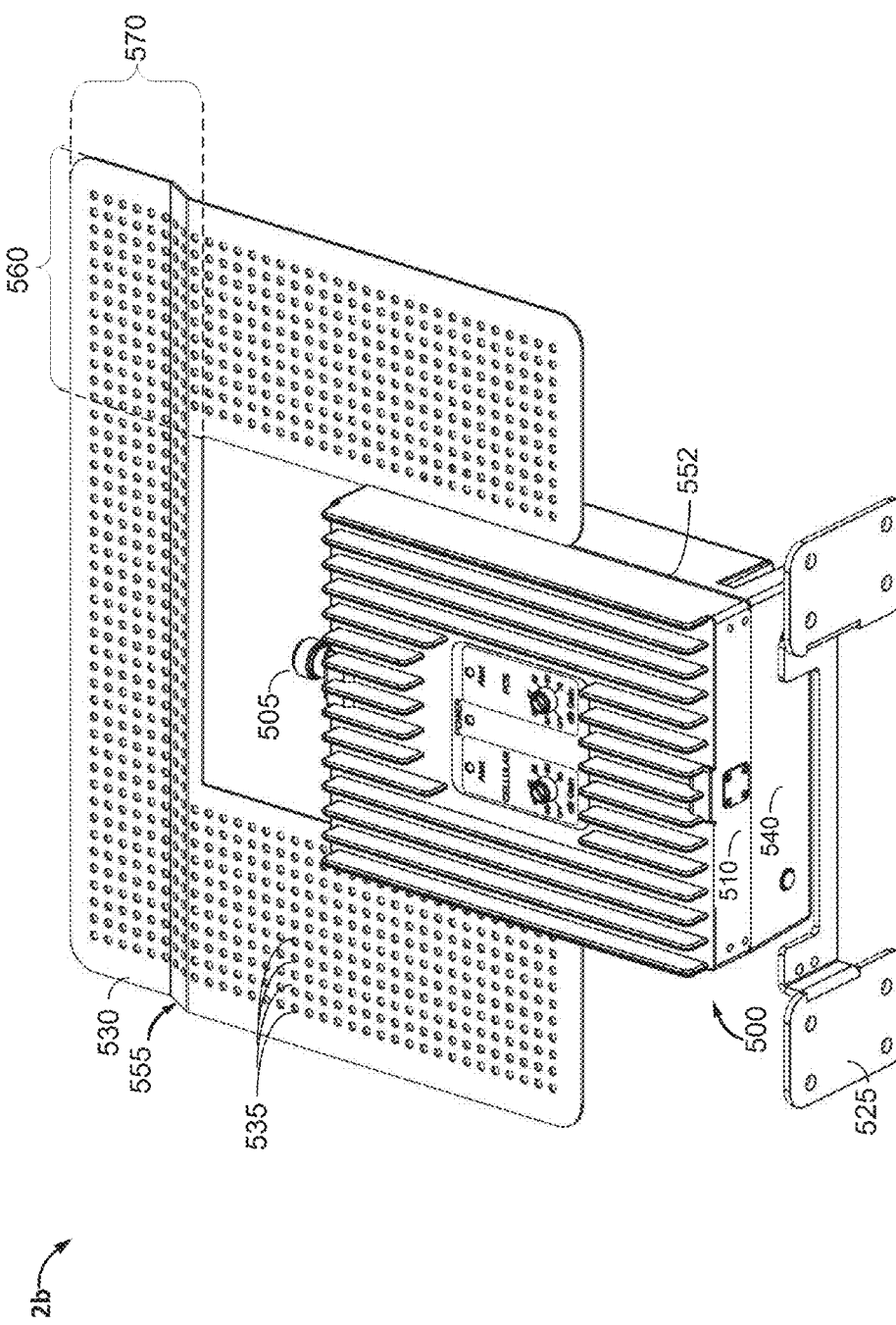
FIG. 5H is a front perspective view of the signal booster of FIG. 1B, with a reflector and a mounting bracket detached.
Figure 5J:
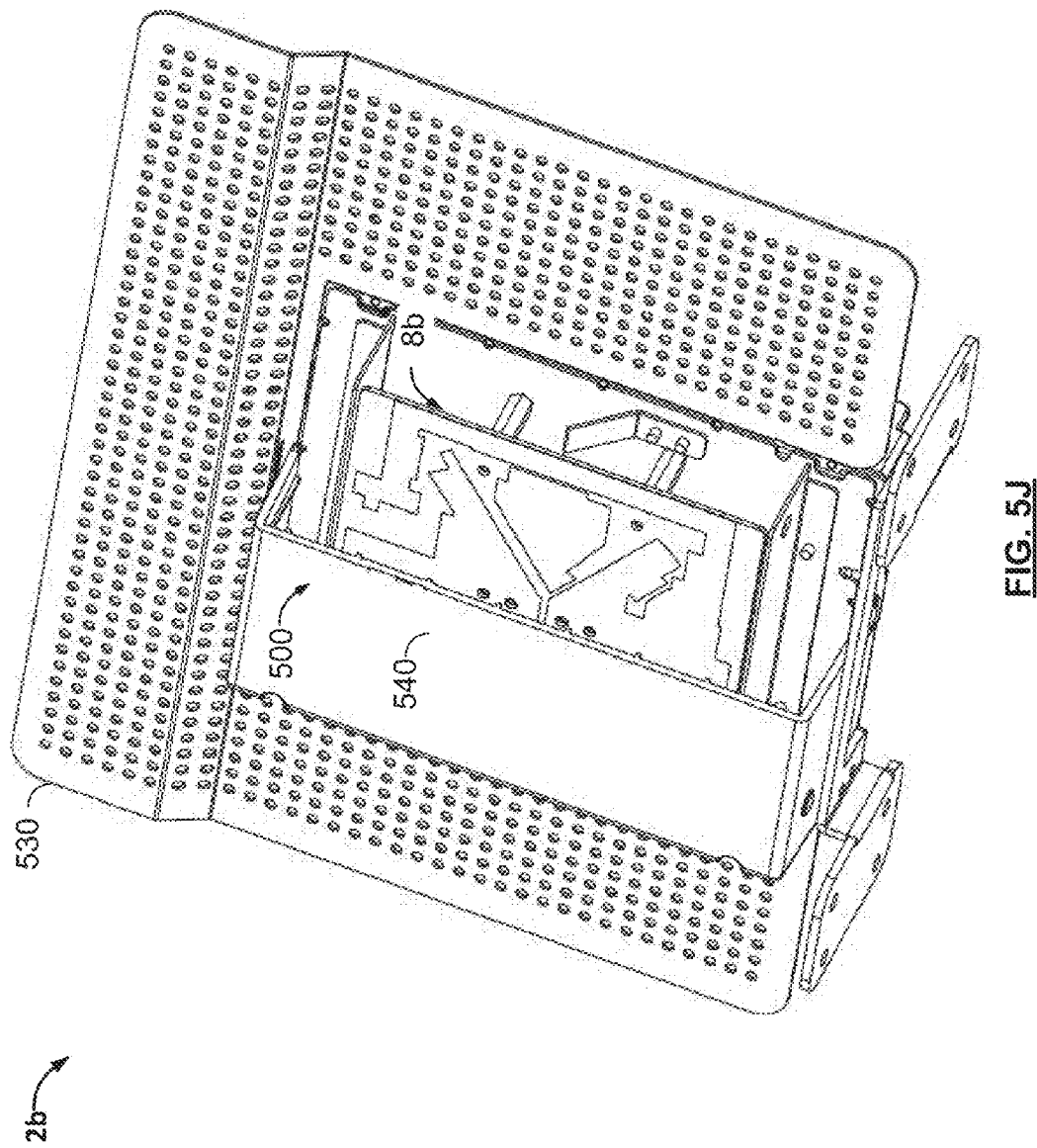
FIG. 5J is a rear perspective view of the signal booster of FIG. 1B, with a rear cover partially cut away and a base station antenna exposed.

FIGS. 5A-5J illustrate various views of the signal booster 2b of FIG. 1B, according to one embodiment. The signal booster 2b includes a housing 500 (FIG. 5A), a mobile station antenna port 505 (FIG. 5A), a front cover 510 (FIG. 5A), a plurality of heat fins 515 (FIG. 5A), an input/output panel 520 (FIG. 5A), a mounting bracket 525 (FIG. 5A), a reflector 530 (FIG. 5A) including a plurality of perforations 535 (FIG. 5A), a power switch 538 (FIG. 5A), a back cover 540 (FIG. 5B), a plurality of back cover attachments 545 (FIG. 5B), a power input port 550 (FIG. 5F), and the base station antenna 8b (FIG. 5J). Although the signal booster 2b of FIGS. 5A-5J is described herein with reference to particular components arranged in a particular configuration, in various embodiments, components herein can be combined, divided, arranged in a different order, or omitted, and additional components can be added.

FIG. 5A is a front view of the signal booster 2b of FIG. 1B. FIG. 5B is a rear view of the signal booster 2b of FIG. 1B. FIG. 5C is a right-side view of the signal booster 2b of FIG. 1B. FIG. 5D is a left-side view of the signal booster 2b of FIG. 1B. FIG. 5E is a bottom view of the signal booster 2b of FIG. 1B. FIG. 5F is a top view of the signal booster 2b of FIG. 1B. FIG. 5G is a front view of the signal booster 2b of FIG. 1B. FIG. 5H is a front perspective view of the signal booster 2b of FIG. 1B, with the reflector 530 and the mounting bracket 525 detached. FIG. 5I is a rear view of the signal booster 2b of FIG. 1B. FIG. 5J is a rear perspective view of the signal booster 2b of FIG. 1B, with the rear cover 540 partially cut away and the base station antenna 8b exposed. It will be understood that the orientations are relative and the entire signal booster 2b can be placed and held in any desired orientation.

The housing 500 of the signal booster 2b can be used to house the circuitry or components of the signal booster 2b (for example, the circuitry of the signal boosters 50 or 100 of FIGS. 3-4), and can include front and rear covers 510 and 540. The housing 500 can have a variety of form factors. In the illustrated configuration, the housing 500 can have a rectangular perimeter when viewed from the front or back. However, other configurations are possible. For instance, the housing 500 can have a circular perimeter. In one embodiment, the housing 500 has a height in the range of about 10 cm to about 50 cm, a width in the range of about 10 cm to about 50 cm, and a depth in the range of about 2 cm to about 20 cm. Although one example of dimensional ranges for the housing 500 has been provided, other configurations are possible.

The mobile station antenna port 505 can be used to connect the signal booster 2b to an antenna (not illustrated in FIGS. 5A-5J) such as, for example, the mobile station antenna 5b of FIG. 1B. For example, in certain implementations, the mobile station antenna port 505 can be connected to an indoor antenna using an RF cable such as, for example, the remote RF cable 6b of FIG. 1B. However, other configurations are possible, such as configurations having additional antenna ports for additional antennas for each or different frequency bands or to support multiple-input multiple-output (MIMO) antennas.

In the illustrated embodiment, the mobile station antenna port 505 is located on a top surface of the front cover 510. In other embodiments the mobile station antenna port 505 can be located on the same side with the signal booster 2b.

In the illustrated embodiment, one or more PCBs (including multiplexers, filtering and amplification circuitry, such as those of the signal boosters 50 or 100 of FIGS. 3-4) are positioned in one or more cavities of the front cover 510. In certain configurations, a first PCB includes circuitry associated with one or more low frequency RF bands, such as RF bands having a frequency less than 1 GHz, and a second PCB includes circuitry associated with one or more high frequency RF bands, such as RF bands having a frequency greater than 1 GHz. For example, in one embodiment, a first PCB includes circuitry for boosting at least one signal of Band XII, Band XIII, and Band V, and a second PCB includes circuitry for boosting at least one signal of Band II and Band IV. However, other configurations are possible.

The front cover 510 can be made from a conductive material, and can thereby act as a Faraday cage in conjunction with a shield 610 (see FIG. 6) positioned between the front cover 510 and the rear cover 540. Configuring the signal booster 2b in this manner can aid in providing RF shielding or isolation for circuitry within the front cover 510. The shielding portion 610 can also aid in providing thermal dissipation for booster circuitry.

In various embodiments, the front cover 510 can be implemented using a variety of materials, including, for example, metals, such as aluminum or steel. In one embodiment, the front cover 510 has a height in the range of about 10 cm to about 50 cm, a width in the range of about 10 cm to about 50 cm, and a depth in the range of about 1 cm to about 10 cm. Although one example of dimensional ranges for the front cover 510 has been provided, other configurations are possible.

To aid in removing heat, the housing 500 can include one or more fin structures used to dissipate heat. For example, in the illustrated configuration, the front cover 510 has been implemented to include heat fins 515. The heat fins 515 can be used to dissipate heat, including, for example, heat dissipated through the front cover 510. The heat fins 515 can be arranged on the housing 500 so as to be oriented vertically when the signal booster 2b is mounted in a window according to a preferred embodiment.

The input/output panel 520 serves to provide one or more user inputs and/or outputs. In various embodiments, the input/output panel 520 can be a front panel, a display panel, or control panel. For example, the input/output panel 520 can provide one or more status indicators and/or gain control inputs, each related to one or more wireless communication bands. Although the input/output panel 520 is illustrated as a single panel, a person having ordinary skill in the art will appreciate that individual inputs or outputs can be located anywhere on the signal booster 2b. The input/output panel 520 is discussed in further detail below with respect to FIG. 7.

The mounting bracket 525 serves to provide structural support for the signal booster 2b, for example at a mounting point (see FIG. 9). The mounting bracket 525 can be implemented using a variety of materials, including, for example, metals, such as aluminum, copper, or steel. As shown in FIG. 5H, the mounting bracket 525 can be attached to (or removed from) the front cover 510 of the housing 500, for example via screws. In some embodiments, the mounting bracket 525 can be omitted.

In the illustrated embodiment, the mounting bracket 525 is attached to a bottom side of the housing 500. In some embodiments, no inputs or outputs are provided on the side of the housing 500 to which the mounting bracket 525 is attached. For example, the mounting bracket 525 can be attached to a side of the housing 500 opposite to a side at which the mobile station antenna port 505 is provided. Such configuration allows the mounting bracket 525 to have a lower profile, for example when the signal booster 2b is mounted in a window (see FIG. 9). Advantageously, material costs for the mounting bracket 525 can be reduced, and visibility out a window increased.

The reflector 530 serves as an isolator between the two antennae to reflect, shield, or reduce undesirable feedback and/or signal interference between the mobile station antenna 5b (FIG. 1B) and the base station antenna 8a (FIG. 1B) over the air. In various embodiments, the reflector 530 can be implemented using a variety of conductive materials, including, for example, metals, such as aluminum, copper, or steel. As shown in FIG. 5H, the reflector 530 can be inserted (or removed from) a slot 552 between the front cover 510 and the rear cover 540 of the housing 500. In some embodiments, the reflector 530 can be omitted.

The reflector 530 can extend in a plane substantially parallel to faces of the front cover 510 and the rear cover 540, and can contact three sides (for example, a left side, right side, and top side) of the housing 500. In some embodiments, the reflector 530 can extend from four sides of the housing 500. In the illustrated embodiment, a portion of the reflector 530 is omitted from a side of the housing 500 to which the mounting bracket 525 attaches.

In various embodiments, the reflector 530 can extend from the housing 500 by at least ¼ the wavelength of the lowest frequency communication signal for which the signal booster 2b is configured to transmit or receive. In some embodiments, the reflector 530 can be sized sufficiently large to increase base station antenna 8b front-to-back ratio by at least a threshold amount, for example 2 dB to 9 dB. In one embodiment, the reflector 530 can extend in an upper portion 570 in the range of about 2 cm to about 100 cm. In one embodiment, the reflector 530 can extend in a side portion 560 in the range of about 2 cm to about 50 cm. In some embodiments, the extent of the upper portion 570 can be equal to the extent of the side portion 560. In one embodiment, a total width of the reflector 530 can be in the range of about 10 cm to about 200 cm, a total height of the reflector 530 can be in the range of about 10 cm to about 200 cm, and a thickness of the reflector 530 can be in the range of about 0.1 cm to about 1 cm. Although one example of dimensional ranges for the reflector 530 has been provided, other configurations are possible.

In various embodiments, the reflector 530 can include a plurality of perforations 535 (FIG. 5H). The perforations 535 can improve visibility and visible light infiltration, for example when the signal booster 2b is mounted in a window (see FIG. 9). Although the perforations 535 are shown as circular, other shapes are possible. In some embodiments, the perforations 535 can be sized according to a wavelength of the highest frequency signal transmitted or received by the signal booster 2b. For example, the perforations 535 can be sized such that visible light can pass though the perforations, but the highest frequency signal transmitted or received by the signal booster 2b does not significantly pass through the perforations. As used herein, significant signal transmission can include, for example, signal transmission above a threshold. The threshold can include, for example, a sufficient signal to introduce errors as interference. In one embodiment, each perforation 535 has a diameter in the range of about 1 mm to about 20 mm, and a spacing of about 1 mm to about 20 mm. Although one example of dimensional ranges for the perforations 535 has been provided, other configurations are possible. In some embodiments, the perforations 535 can be omitted.

In various embodiments, the reflector 530 can include one or more zigzags 555 (FIG. 5H). For example, in the illustrated embodiment, the zigzag 555 brings an upper portion 570 of the reflector 530 towards a rear of the housing 500. In an embodiment, the upper portion 570 can be closer to the rear of the housing 500 by an amount less than or equal to a standoff 625 (FIG. 6) height. Bringing the upper portion 570 of the reflector 530 towards a rear of the housing 500, and thus towards the base station antenna 8b (FIG. 5J), increases the advantageous effects of the reflector 530 such as, for example, reduced feedback between the base station antenna 8b (FIG. 5J) and the mobile station antenna 5b. In one embodiment, the zigzag 555 has a depth in the range of about 1 mm to about 40 mm. In some embodiments, the zigzag 555 can be sufficiently large to allow attachment of the RF cable 6b to the mobile station antenna port 505. Although one example of dimensional ranges for the zigzag 555 has been provided, other configurations are possible.

The power switch 538 (FIGS. 5D and 5F) serves to turn the signal booster 2b on and off. In the illustrated embodiment, the power switch 538 is located on a top surface of the front cover 510. In some preferred embodiments, the power switch 538 is provided at a portion of the signal booster 2b opposite a portion at which the mounting bracket 525 is provided. Accordingly, the power switch 538 can be manipulated without interference from the mounting bracket 525 or a surface to which the signal booster 2b is mounted.

The power input port 550 (FIG. 5F) can be used to connect the signal booster 2b to a power source such as, for example, mains power or battery power (DC or AC). For example, in certain implementations, the power input port 550 can be connected to a power cable 920 (FIG. 9). In the illustrated embodiment, the power input port 550 is located on a top surface of the front cover 510. In some preferred embodiments, the power input port 550 is provided at a portion of the signal booster 2b opposite a portion at which the mounting bracket 525 is provided. Accordingly, the power input port 550 can be manipulated without interference from the mounting bracket 525 or a surface to which the signal booster 2b is mounted.

As shown in FIG. 5J, one or more PCBs (including the base station antenna 8b) are positioned in one or more cavities of the rear cover 540. The base station antenna 8b is described in further detail below with respect to FIG. 6. The rear cover 540 can be made from an RF transparent material. Configuring the signal booster 2b in this manner can provide mechanical protection for the base station antenna 8b without degrading RF signal strength.

In various embodiments, the rear cover 540 can be implemented using a variety of materials, including, for example, plastics. In one embodiment, the rear cover 540 has a height in the range of about 10 cm to about 50 cm, a width in the range of about 10 cm to about 50 cm, and a depth in the range of about 1 cm to about 10 cm. Although one example of dimensional ranges for the rear cover 540 has been provided, other configurations are possible.

Although not illustrated in FIGS. 5A-5J, the signal booster 2b can include a variety of other components, including, for example, fasteners, connectors, or adhesives used to assemble the signal booster 2b. Although one example of a signal booster 2b has been described, the teachings herein are applicable to other configurations of signal boosters. For example, the teachings herein are applicable to configurations using a single PCB, and/or to configurations using a housing of a different form factor.

FIG. 6 is a perspective view of the base station antenna 8b of FIG. 1B. As shown in FIG. 6, the base station antenna 8b includes a shield 610, an antenna PCB 615, a plurality of antenna traces 620, a plurality of standoffs 625, a top support 630, and a bottom support 635. Although the base station antenna 8*b* of FIG. 6 is described herein with reference to particular components arranged in a particular configuration, in various embodiments, components herein can be combined, divided, arranged in a different order, or omitted, and additional components can be added.

The shield 610 serves to provide RF shielding or isolation, in conjunction with the front cover 510, for circuitry within the front cover 510. In some embodiments, the shield 610 can form a Faraday cage in conjunction with the front cover 510. The shielding portion 610 can also aid in providing thermal dissipation for booster circuitry. In the illustrated embodiment, the shield 610 further provides structural support for the standoffs 625, the top support 630, and the bottom support 635. The shield 610 further serves as a reflector for the antenna traces 620.

The antenna PCB 615 serves to provide structural and fabrication support for the antenna traces 620. In one embodiment, the antenna PCB 615 has a height (measured with respect to the orientation of FIG. 5A) in the range of about 1 cm to about 100 cm, a width in the range of about 1 cm to about 100 cm, and a thickness in the range of about 0.1 cm to about 1 cm. In other embodiments the thickness can be small than 0.1 cm. Although one example of dimensional ranges for the antenna PCB 615 has been provided, other configurations are possible.

The antenna traces 620 serve to receive downlink signals from base stations, and to transmit uplink signals to base stations. In the illustrated embodiment, the antenna traces 620 are configured as a bidirectional flat antenna, one side of which is reflected by the shield 610 and/or the reflector 530. Accordingly, the base station antenna 8*b* as a whole is configured to provide an antenna radiation pattern substantially in the direction of the rear cover 540. For example, when the signal booster 2*b* is mounted in a window (see FIG. 9), the station antenna 8*b* is configured to provide an antenna radiation pattern substantially out the window.

In various embodiments, the antenna traces 620 are connected to an internal base station input port such as, for example, the multiplexer 55*a* (FIG. 3) or the diplexer 111*a* (FIG. 4). The antenna traces 620 can be connected via a local RF cable, which can be relatively short and high quality as compared to the remote RF cable 5*a* shown in FIG. 1A. In one embodiment, the local RF cable (not shown) can have a length in the range of about 1 cm to about 20 cm, a length in the range of about 5 cm to 15 cm, and more particularly about 10 cm. The local RF cable can have a signal attenuation in the range of about 0.01 dB to about 10 dB, in the range of about 0.05 dB to about 1 dB, and more particularly about 0.1 dB.

The standoffs 625 are configured to separate the antenna PCB 615 from the shield 610. In one embodiment, the standoffs 625 have a height in the range of about 1 cm to about 10 cm. Although one example of dimensional ranges for the standoffs 625 has been provided, other configurations are possible.

The top and bottom supports 630 and 635 serve to provide structural support for the antenna PCB 615. In some embodiments, the top and bottom supports 630 and 635 further serve as reflectors to create a resonant cavity between the antenna traces 620 and the shield 610. In one embodiment, the top and bottom supports 630 and 635 have a height in the range of about 1 cm to about 10 cm, and a thickness in the range of about 1 mm to about 10 mm. Although one example of dimensional ranges for the standoffs 625 has been provided, other configurations are possible.

In various embodiments, the signal booster 2*b* can include multiple base station antennas 8*a* or 8*b*. For example, the signal booster 2*b* can include a separate base station antenna 8*b* for high frequency bands (for example, those over 1 GHz) and a separate base station antenna 8*b* for low frequency bands (for example, those 1 GHz and under). As another example, the signal booster 2*b* can include a separate base station antenna 8*b* for uplink bands and a separate base station antenna 8*b* for downlink bands. In various embodiments, separate base station antennas can be implemented as entire antenna modules 8*b* (FIG. 6) or as separately connected traces 620 on one or more antenna modules 8*a*.

Figure 7:
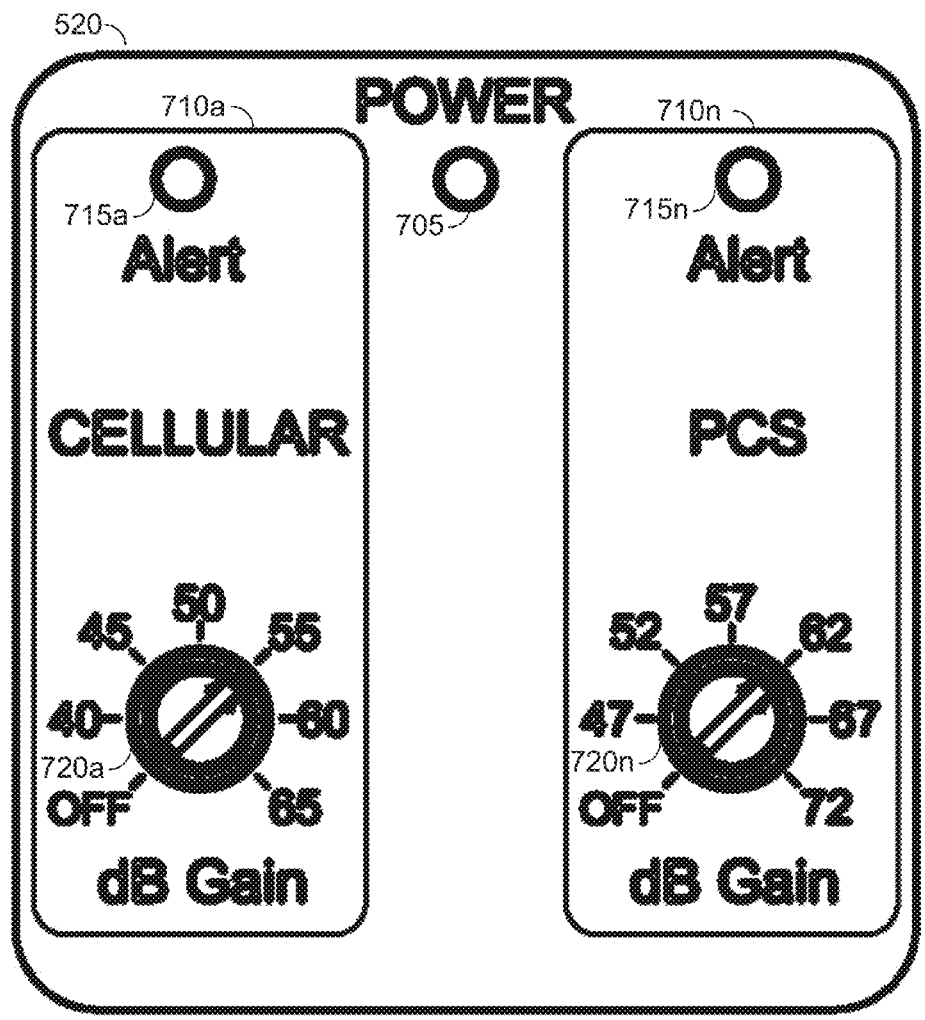
FIG. 7 is a plan view of the gain control panel of FIG. 5A.

FIG. 7 is a plan view of the input/output panel 520 of FIG. 5A. In the illustrated embodiment, the input/output panel 520 includes a power indicator 705 and input/output interfaces 710*a*-710*n* for each of a plurality of frequency bands or groups of bands. Although the input/output panel 520 of FIG. 5G is described herein with reference to particular components arranged in a particular configuration, in various embodiments, components herein can be combined, divided, arranged in a different order, or omitted, and additional components can be added. For example, while the input/output panel 520 is illustrated as a single panel, a person having ordinary skill in the art will appreciate that individual inputs or outputs can be located anywhere on the signal booster 2*b*.

The power indicator 705 serves to indicate whether the unit is on or off. In various embodiments, the power indicator 705 can include an LED light, a text or graphic status display, a speaker, or any other output. In some embodiments, the power indicator 705 can be omitted.

Each input/output interface 710*a*-710*n* includes an alert indicator 715*a*-715*n* and a gain control 720*a*-720*n*. Although two input/output interfaces 710*a* and 710*n* are shown in FIG. 7, separate interfaces can be provided for any individual frequency bands or channels (or combinations thereof) received and/or transmitted by the signal booster 2*b*. For example, separate interfaces can be provided for any combination of Bands I-VII, discussed above.

The alert indicator 715*a*-715*n* serves to provide a status indication for a respective frequency band or group of bands. In various embodiments, the alert indicator 715*a*-715*n* can include an LED light, a text or graphic status display, a speaker, or any other output. In some embodiments, the alert indicator 715*a*-715*n* can be omitted.

The gain control 720*a*-720*n* serves to receive a gain input for a respective frequency band or group of bands. In various embodiments, the gain control 720*a*-720*n* can include a knob, slider, one or more buttons, or any other input control. In some embodiments, the gain control 720*a*-720*n* can be omitted.

FIG. 8 illustrates the signal booster system 7*b* of FIG. 1B, according to an example embodiment. In the illustrated configuration, the signal booster 2*b* is connected via an RF cable 6*b* to a mobile station antenna 5*b*. The illustrated mobile station antenna 5*b* is a table-top omnidirectional antenna.

FIG. 9 illustrates an example configuration 900 of the signal booster 2*b* of FIG. 1B, according to one embodiment. In the illustrated configuration, the signal booster 2*b* is connected via an RF cable 6*b* with a right-angle connector to a mobile station antenna 5*b*. The signal booster 2*b* is further connected via a power cable 920 to a power source 922.

The illustrated mobile station antenna 5*b* is an omnidirectional antenna placed on a table 915. In other embodiments, the mobile station antenna 5b can be another type of antenna, for example a directional plate antenna mounted on a wall, a corner antenna mounted in a corner, or a conical antenna mounted on the ceiling. In some embodiments, the RF cable 6b can be split (or two or more mobile station antenna output ports can be provided) and multiple mobile station antennas can be used. In one embodiment with multiple mobile station antennas, a lower gain can be provided at a mobile station antenna nearest to the signal booster 2b, and a higher gain can be provided at a mobile station antenna furthest from the signal booster 2b. Different relative gains can be provided by varying splitter (or coupler) output gains (for example, 3 dB to 20 dB), cable attenuations, and/or antenna gains. Accordingly, feedback and/or unwanted interference can be reduced.

In some embodiments, because the RF cable 6b is connected to the signal booster 2b post-amplification, the RF cable 6b can be a relatively low cost cable, with high signal attenuation or low shielding, as compared to the RF cable 6a of FIG. 1A. Moreover, as compared to the signal booster system 7a of FIG. 1A, the RF cable 6a can be omitted. Accordingly, installation costs can be lower for the illustrated configuration 900 as compared to the signal booster system 7a of FIG. 1A.

The signal booster 2b is mounted in a window 910, with the rear cover facing the outdoors through the window 910. As shown, the signal booster 2b is mounted on a bottom ledge 912 of the window. In other embodiments, the signal booster 2b can be mounted in other locations such as, for example, a side or top of the window, against a wall, on the roof, etc. In the illustrated embodiment, however, visual disruption of the window 910, and installation complexity for the RF cable 6b and power cable 920, can be reduced (and isolation can be improved).

In some embodiments, the RF cable 6b can be omitted, and the signal booster 2b can communicate with the mobile station antenna 5b using a secondary communication system such as, for example, Bluetooth™, Wi-Fi, infrared, etc. In some embodiments, such approaches can introduce limitations into the signal booster system 7b. For example, when the secondary communication system is narrowband with respect to the capabilities of the signal booster 2b, one or more wireless communication bands will be omitted.

In some embodiments, the signal booster 2b can employ a known Interference Cancellation System (ICS) configured to use a digital or analog system to cancel feedback between the mobile station antenna 5b and the base station antenna 8a or 8b. ICS can be employed in addition to, or in alternative to, use of the reflector 530. However, in embodiments—when the signal booster 2b is configured to amplify signals of relatively wide frequency bands, power, component, and design costs can increase significantly. In some embodiments, the signal booster 2b can be configured to employ ICS only for low frequency signals such as, for example, signals from 700-800 MHz or signals 1 GHz and below. The signal booster 2b can be configured to refrain from using ICS for high frequency signals such as, for example, signals from 1.7-2.1 GHz or signals above 1 GHz. In some embodiments, the reflector 530 can be made relatively smaller when employing ICS only for low frequency signals, as compared to reflector 530 size when not employing ICS.

Figure 10A:
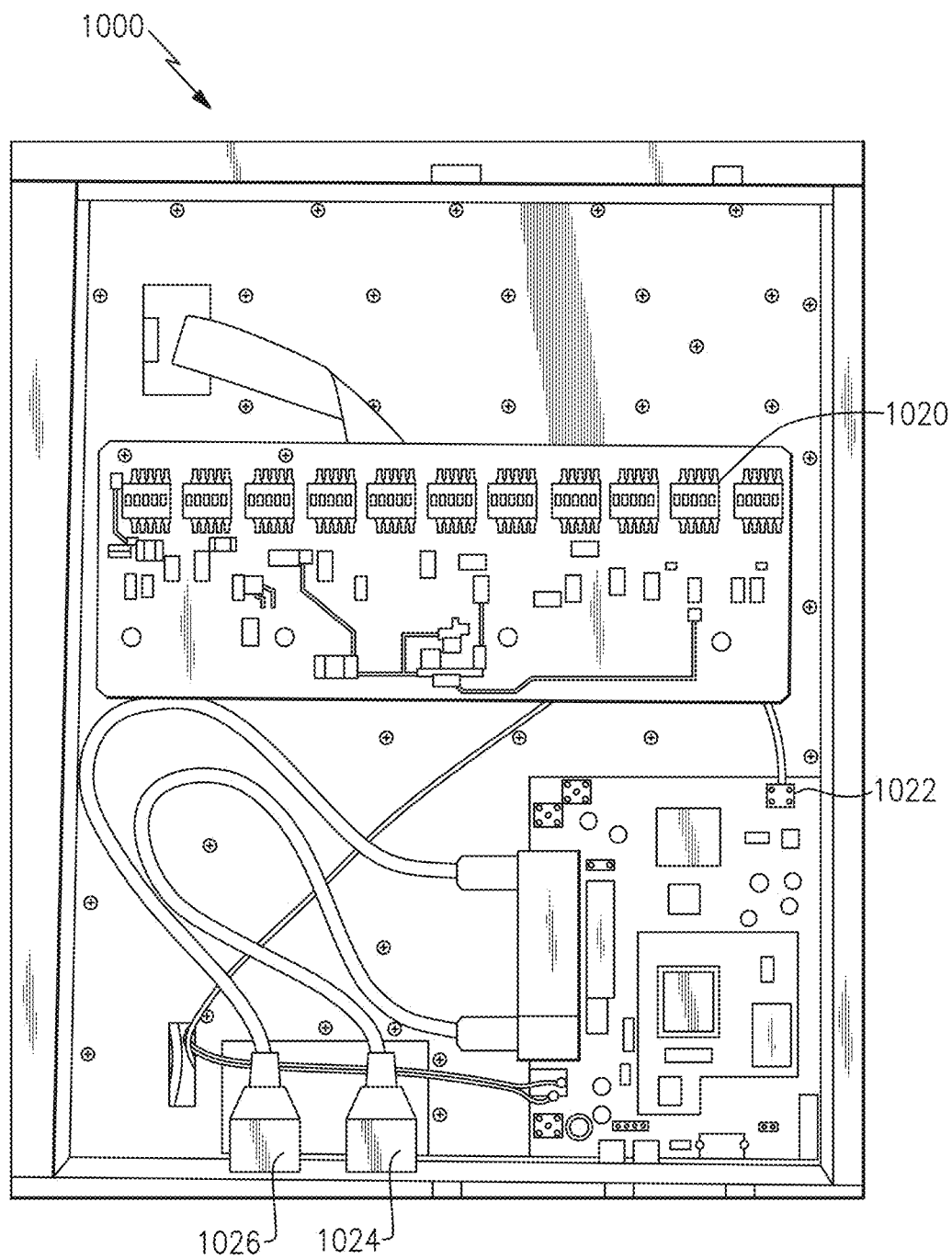
FIG. 10A is a top view of a signal booster with an internal router according to an embodiment.

FIG. 10A is a top view of a signal booster 1000 with an internal router 1022 according to an embodiment. The signal booster 1000 includes a first printed circuit (PC) board 1020, the internal router 1022, a first cable 1024, and a second cable 1026. The first PC board 1020 can be a circuit realization of uplink and downlink channels similar to those of the signal booster 100 of FIG. 4; in addition components, including amplifiers, filters, diplexers, and duplexers, of the first PC board 1020 can be similar to those of the signal booster 100 of FIG. 4. In other configurations the first PC board 1020 can be used to provide status indicators with control knobs to adjust a gain of internal RF circuitry. Further, the operation of the components can be similar to the operation of components of the signal booster 100 of FIG. 4. Also, the internal router 1022 can access the Internet via the first cable 1024 and the second cable 1026; and the internal router 1022 can also be referred to simply as the router 1022.

Advantageously, the internal router 1022 can be located inside the signal booster 1000 so as to allow the end-user convenient access to both cellular and WiFi. The uplink and downlink channels can be signals, such as cellular or PCS, requiring frequency division duplexing while the internal router 1022 can provide signals from the Internet which are inherently based on time division duplexing. The signal booster 1000 can diplex output WiFi signals with frequency division duplexed signals of the internal router while so that both WiFi and cellular or similar signals are available via an internal antenna such as the Indoor Antenna 5b of FIG. 1B. An RF cable, similar to the RF cable 6b of FIG. 1B, can conveniently carry both the Cellular and/or PCS signal data while additionally availing WiFi signals to the internal antenna.

Figure 10B:
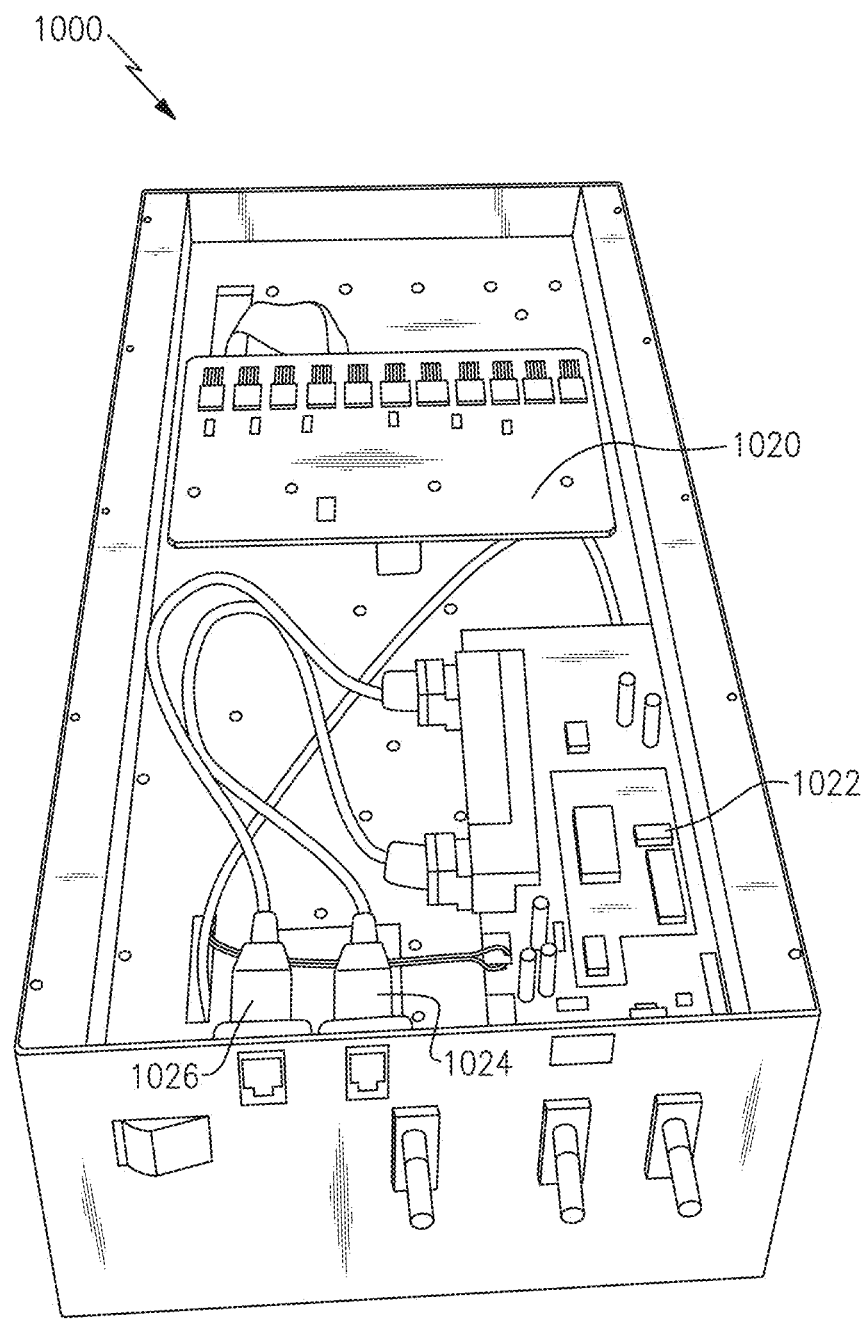
FIG. 10B is a top perspective view of the signal booster with the internal router of FIG. 10A.

FIG. 10B is a top perspective view of the signal booster 1000 with the internal router 1022 of FIG. 10A. As shown in FIG. 10B the first cable 1024 can connect to a wide area network (W)AN so that the router 1022 routes signals from the WAN. Also as shown the second cable 1026 can connect to a local area network (LAN) so that the router 1022 routes signals from the LAN.

Although FIG. 10B shows the internal router 1022 as being connected to the WAN and/or the LAN, other configurations are possible. For instance, the internal router 1022 can be connected to a USB port capable of accepting a 3G/4G (third generation or fourth generation cellular network) USB (universal serial bus) dongle. Alternatively the internal router (or router) 1022 can be a MiFi® which can access the Internet via a 3G/4G network antenna.

Figure 11A:
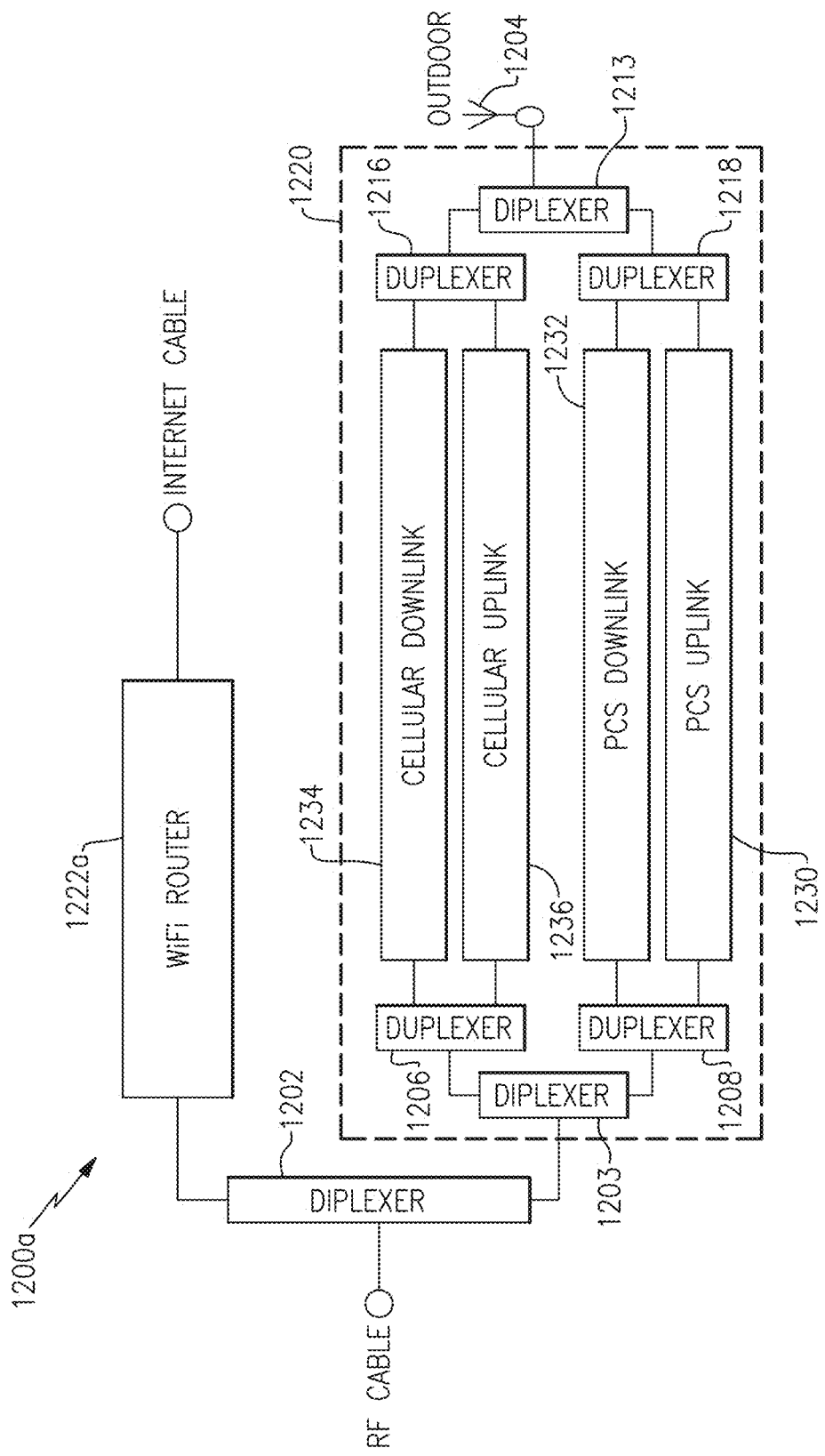
FIG. 11A is a schematic diagram of a signal booster for uplink and downlink channels including a WiFi router according to an embodiment.

FIG. 11A is a schematic diagram of a signal booster 1200a for uplink and downlink channels including a WiFi router 1222a according to an embodiment. The signal booster 1200a includes the WiFi router 1222a, a diplexer 1202, and a channel section 1220. The WiFi router 1222a connects to the Internet via an Internet cable and can be a schematic depiction of the internal router 1022 of FIGS. 10A and 10B such that the Internet cable can be either the first cable 1024 or the second cable 1026. The channel section 1220 transmits and receives frequency division duplex (FDD) signals, such as cellular or PCS, from an outdoor antenna 1204. The diplexer 1202 transmits signals, WiFi and FDD signals, via an RF cable. The RF cable can be similar to the RF cable 6b of FIG. 1B, and the outdoor antenna 1204 can be similar to the outdoor antenna 8a of FIG. 1B.

The channel section 1220 can similar to the FDD signal channels of the signal booster 2b of FIG. 1B. The channel section 1220 includes a diplexer 1203, a diplexer 1213, a duplexer 1206, a duplexer 1216, a duplexer 1208, a duplexer 1218, a cellular downlink channel 1234, a cellular uplink channel 1236, a PCS downlink channel 1232, and a PCS uplink channel 1230. The cellular downlink channel 1234, the cellular uplink channel 1236, the PCS downlink channel 1232, and the PCS uplink channel 1230 can be similar to those described with respect to FIG. 1B and FIG. 4. The uplink and downlink channels can have amplifiers, filters, attenuators, and components necessary to boost or attenuate channel signals as described in the previous figures.

As shown in FIG. 11A, the diplexer 1213 provides signal path transmission and reception via connection to the outdoor antenna 1204 for the FDD signals derived from the duplexer 1216 and the duplexer 1218. The duplexer 1216 provides cellular downlink signals to the cellular downlink channel 1234 and receives cellular uplink signals from the cellular uplink channel 1236. Similarly, the duplexer 1218 provides cellular downlink signals to the PCS downlink channel 1232 and receives cellular uplink signals from the PCS uplink channel 1230.

Also as shown in FIG. 11A, the diplexer 1203 provides signal path transmission and reception via connection to the diplexer 1202 for the FDD signals derived from the duplexer 1206 and the duplexer 1208. As shown, the duplexer 1206 receives cellular downlink signals from the cellular downlink channel 1234 and provides cellular uplink signals from the cellular uplink channel 1236. Similarly, the duplexer 1208 receives cellular downlink signals from the PCS downlink channel 1232 and provides cellular uplink signals to the PCS uplink channel 1230.

The diplexer 1202 receives and transmits time division duplex (TDD) signals from the WiFi router 1222a and receives and transmits FDD signals from the diplexer 1203 of the channel section 1220. The diplexer combines the WiFi and boosted FDD signals for transmission and reception via the RF cable. The RF cable can be connected to an indoor antenna such as the indoor antenna 5b of FIG. 1B.

Figure 11B:
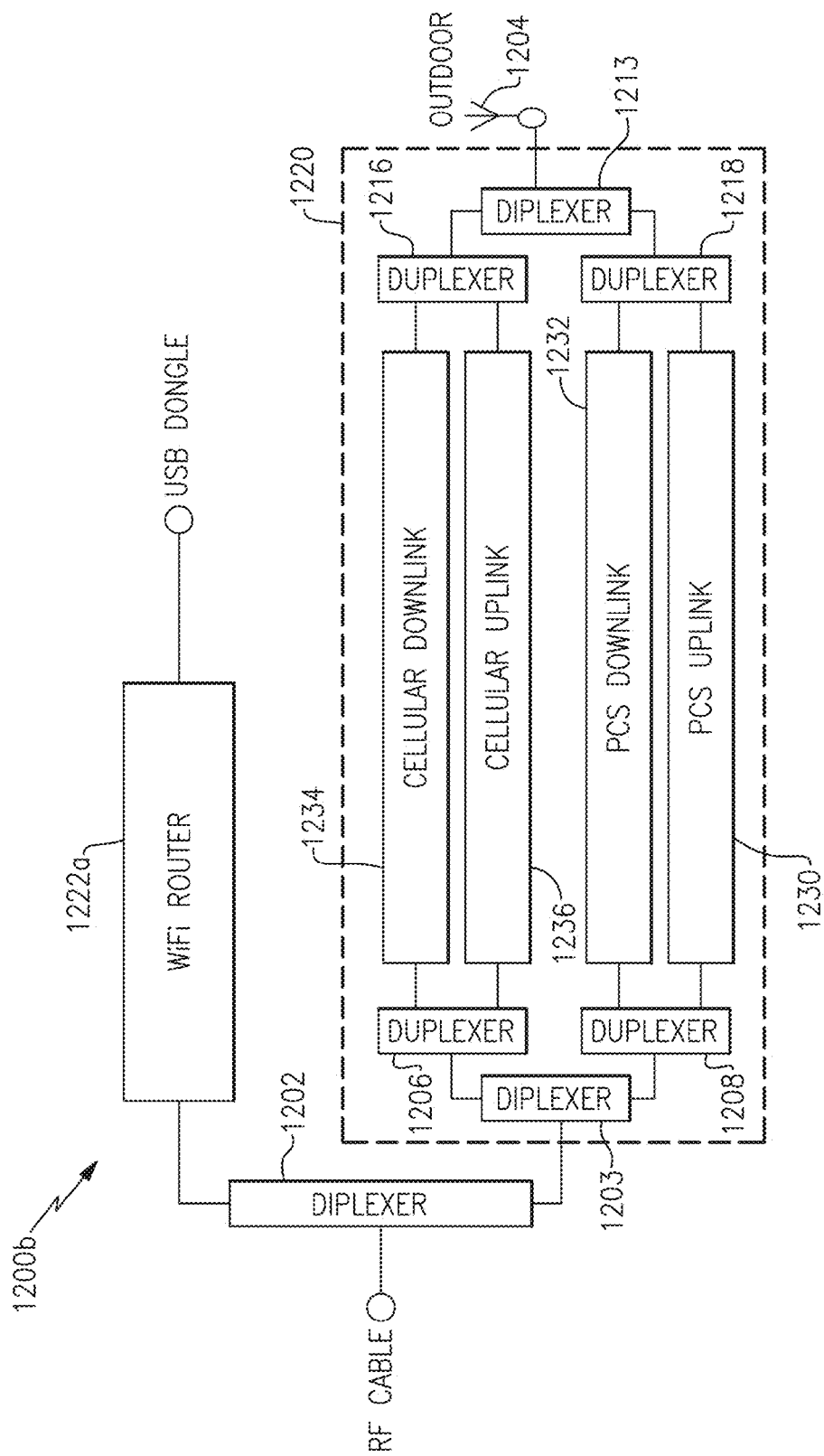
FIG. 11B is a schematic diagram of a signal booster for uplink and downlink channels including the WiFi router according to another embodiment.

FIG. 11B is a schematic diagram of a signal booster 1200b for uplink and downlink channels including the WiFi router 1222a according to another embodiment. The signal booster 1200b is similar to the signal booster 1200a except the WiFi router 1222a connects to a 3G/4G USB dongle.

Figure 11C:
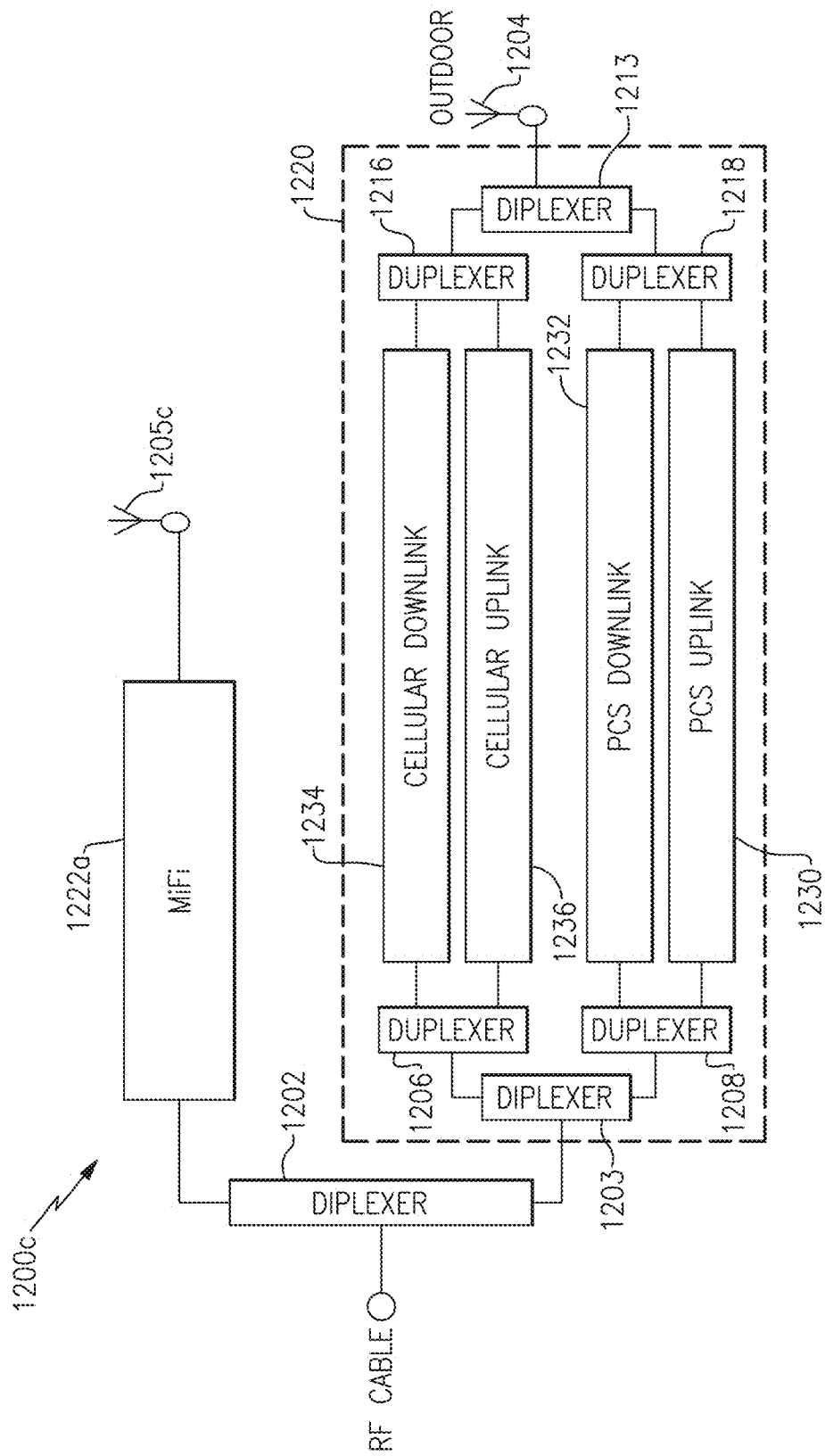
FIG. 11C is a schematic diagram of a signal booster for uplink and downlink channels including a MiFi® according to another embodiment.

FIG. 11C is a schematic diagram of a signal booster 1200c for uplink and downlink channels including a MiFi® 1222c according to another embodiment. The signal booster 1200c is similar to the signal booster 1200a except the WiFi router 1222a is replaced with a MiFi® which can access the Internet via a 3G/4G network antenna 1205c.

Figure 12A:
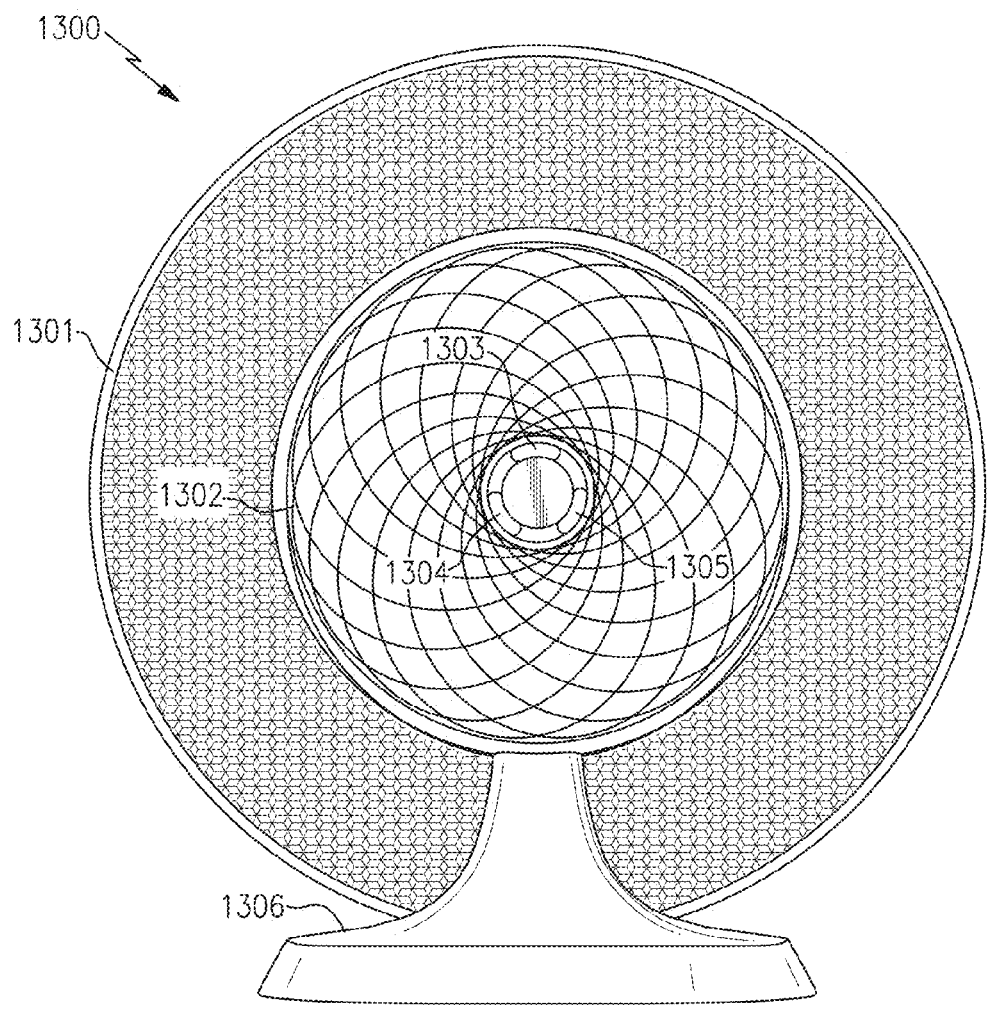
FIG. 12A is a front view of a radio frequency signal booster, according to one embodiment.

FIG. 12A is a front view 1300 of a reflector for use with a signal booster. The signal booster can be, for example, another embodiment of the booster 2b (FIGS. 5A-5J), or the entire booster system 7b (FIG. 8). The front view 1300 includes a reflector 1301, a housing 1302, an LED (light emitting diode) 1303, an LED 1304, an LED 1305, and a base stand 1306. As shown in FIGS. 12A to 12F, the reflector 1301 and the housing 1302 are circular with a curved surface. The reflector 1301 can serve to dissipate heat, with or without a separate heat sink, and has an overall cooling effect. Further, the reflector 1301 can have a plurality of perforations from which light is transmitted.

In various embodiments, the housing 1302 can include a base station antenna (such as the base station antenna 8b of FIG. 6) facing in a first direction. In some embodiments, the housing 1302 further includes a mobile station antenna facing in a second direction opposite the first direction. In other embodiments, the housing 1302 can connect to a separate mobile station antenna (such as the mobile station antenna 5b of FIG. 8). In certain embodiments the base station antenna can be integrated with the housing or located within the housing.

In various embodiments, the reflector 1301 can be another embodiment of the reflector 530 (FIG. 5A). Accordingly, the reflector 1301 can serve to reflect, shield, or otherwise reduce undesirable feedback and/or signal interference between the mobile station antenna and the base station antenna over the air. Like the reflector 530, the reflector 1301 can include perforations that can improve visibility and visible light infiltration, for example when the signal booster is mounted in a window (see FIG. 9).

In the illustrated embodiment, the reflector 1301 is circular, and is concave in the first direction (which can be a direction towards the base station, or exterior of a building to be served). Also, the reflector 1301 is convex in the second direction (which can be a direction toward a mobile station, or interior of a building to be served).

The housing 1302 can be mechanically stabilized on the base stand 1306 for convenient mounting. For instance, the base stand 1306 can be conveniently attached to a nearby window or windowsill with an adhesive, glue, suction cup, and so on. As shown in FIG. 12A, the LEDs 1303-1305 are conveniently positioned in the front to show a state of operation. In various embodiments, the "front" of the housing 1302 can refer to a portion of the housing 1302 that faces the first direction, a user-facing direction, building interior direction, or mobile station direction. For instance, LED 1303 can indicate a power-good state. The brightness of LED 1303 can indicate that the power is sufficient for operation. Similarly, the brightness of LED 1304 can indicate a signal-strength state to determine if an external signal has adequate strength for reception. Also, the brightness of LED 1305 can indicate antenna position state to show if the distance between the mobile station antenna and booster is adequate.

Figure 12B:
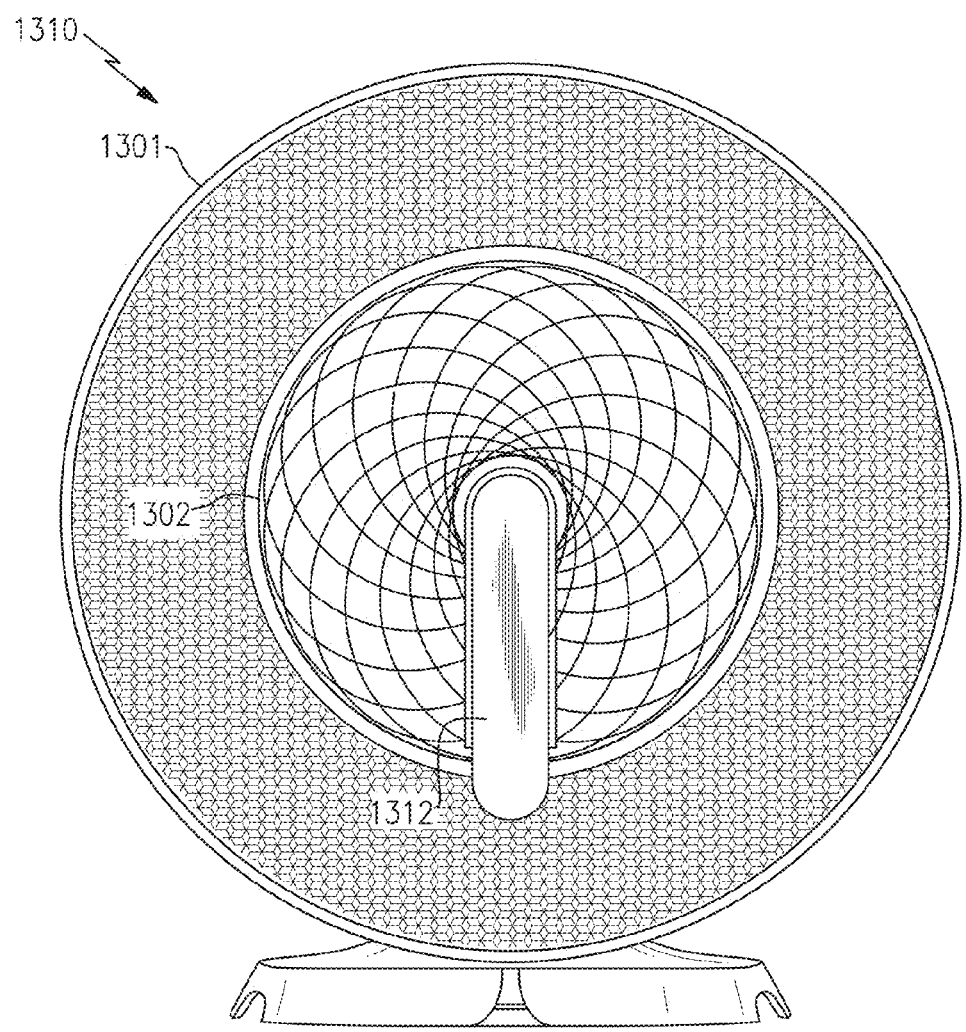
FIG. 12B is a rear section of the radio frequency signal booster of FIG. 12A.

FIG. 12B is a rear section 1310 of the booster. In various embodiments, the "rear" of the housing 1302 can refer to a portion of the housing 1302 that faces the second direction, a building exterior direction, or base station direction. As seen in FIG. 12B, the base stand includes an attachment 1312 which can provide improved mechanical support for the booster. For example the attachment 1312 can be attached with glue to a window.

FIGS. 12C-12F show a right side section 1320, a left side section 1322, a bottom section 1324, and a top section 1326 of the booster, respectively.

In various embodiments, the booster of FIGS. 12A-12F can provide a self-excited adaptive function that can automatically adjust a gain of the booster according to a distance between a base station antenna and a mobile station antenna. As described above the base station antenna can be integrated with the housing, such as being located within the housing. Also, the booster can further include an integrated RF cable and power cord. In various embodiments, the housing 1302 and/or base 1306 can include cooling holes which can reduce temperature and improve performance by allowing the booster to operate at a lower temperature. The reflector 1301 can also serve as a heat sink to carry heat away from the internally housed electronics.

Figure 13A:
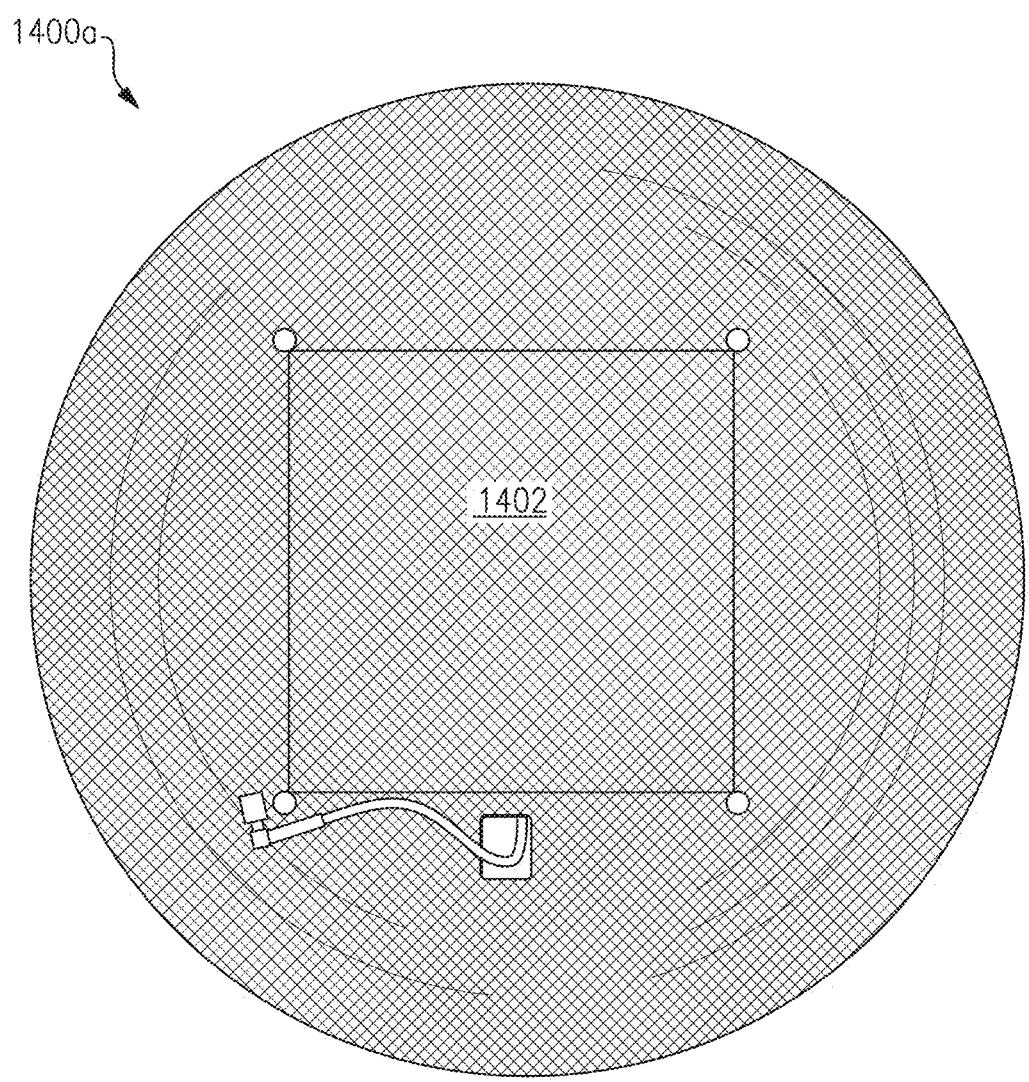
FIG. 13A is a rear view of a radio frequency signal booster showing a position of a heat sink section.

FIG. 13A is a rear view of a radio frequency signal booster 1400a showing a position of a heat sink section 1402. The heat seat section 1402 can be positioned inside the radio frequency signal booster within the rectangular section shown in FIG. 13A.

Figure 13B:
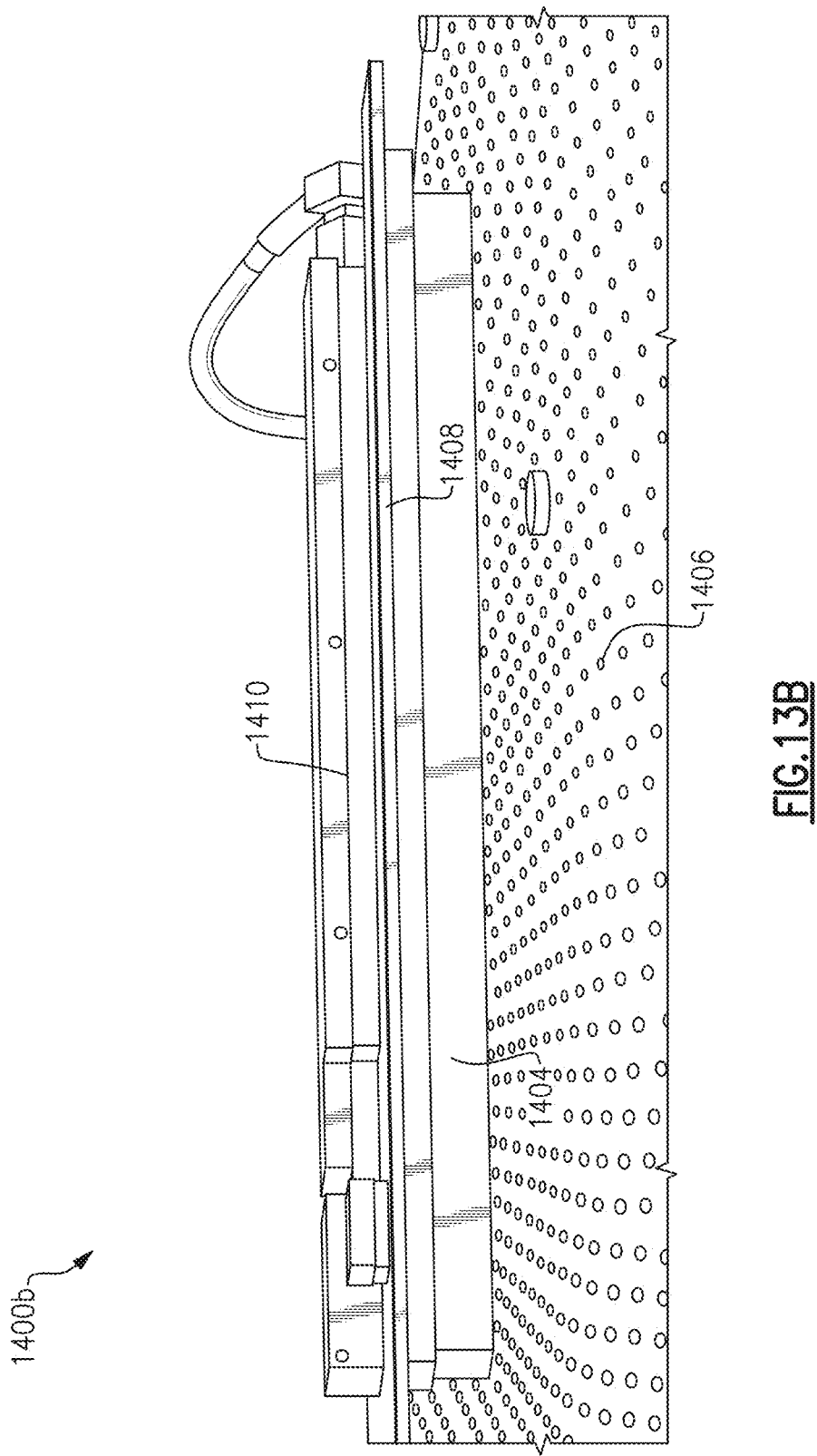
FIG. 13B is an end view of an internal portion of a radio frequency signal booster, showing a heat sink between an electronics board and a reflector.

FIG. 13B is an end view of an internal section 1400b of a radio frequency signal booster with a heat sink 1404. The heat sink 1404 is attached to a reflector section 1406 for support. A printed circuit board (PCB) 1408 carrying electronics for the signal booster can be mounted on the heat sink 1404 between a shielding box 1410 and the heat sink 1404. As one of ordinary skill in the art can appreciate, the heat sink 1404 can allow components, and signal booster components, of the PCB 1408 to operate at higher power levels as compared to a PCB which does not use the heat sink 1404. The heat sink 1404 can dissipate heat from the PCB 1408 so as to reduce operating temperatures of the components and signal booster components of the PCB 1408.

Although FIG. 13B shows an embodiment where the heat sink 1404 provides heat sinking of power dissipation from the PCB 1408, other configurations are possible. For instance, in other configurations, the PCB 1408 can be directly attached to the reflector section 1406 and the reflector section 1406 can operate as a heat sink. The reflector can be designed with a material which has good heat conductivity and functions as a heat sink.

APPLICATIONS

Some of the embodiments described above have provided examples in connection with radio frequency signal boosters. However, the principles and advantages of the embodiments can be used in other suitable systems or apparatus.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency signal booster comprising:
   a housing;
   a first base station antenna located within the housing, the first base station antenna configured as a directional antenna to receive wireless communications signals on one or more downlink channels and to transmit wireless communications signals on one or more uplink channels;
   a mobile station antenna port;
   an omnidirectional mobile station antenna configured to connect to the mobile station antenna port via a radio frequency (RF) cable, for transmission of communications signals on one or more downlink channels and to receive wireless communications signals on one or more uplink channels;
   a reflector integrated with the housing and configured to isolate the first base station antenna from the omnidirectional mobile station antenna;
   a downlink amplifier within the housing, the downlink amplifier configured to amplify signals on downlink channels, received at the first base station antenna, for transmission through the mobile station antenna port; and
   an uplink amplifier within the housing, the uplink amplifier configured to amplify signals on uplink channels, received at the mobile station antenna port, for transmission through the first base station antenna.

2. The radio frequency signal booster of claim 1, wherein the reflector is housed within the housing.

3. The radio frequency signal booster of claim 2, wherein the reflector extends beyond the housing.

4. The radio frequency signal booster of claim 2, wherein the reflector comprises a flat reflector surface.

5. The radio frequency signal booster of claim 2, wherein the reflector comprises a reflector having perforations.

6. The radio frequency signal booster of claim 5, wherein the perforations are configured to pass visible light and to inhibit passage of a highest frequency signal communicated by the signal booster.

7. The radio frequency signal booster of claim 2, wherein the reflector serves as a heat sink for electronics within the housing.

8. The radio frequency signal booster of claim 2, further comprising a heat sink between the reflector and electronics within the housing.

9. The radio frequency signal booster of claim 1, wherein the reflector comprises an RF shield having a first side and a second side opposite the first side, wherein the uplink and downlink amplifiers are positioned on the first side of the RF shield, and the first base station antenna is positioned on the second side of the RF shield.

10. The radio frequency signal booster of claim 9, wherein the RF shield is configured to reflect signals radiated from the directional antenna.

11. The radio frequency signal booster of claim 1, further comprising a second base station antenna, wherein the first base station antenna is configured to transmit and receive signals only of frequencies greater than a threshold frequency and the second base station antenna is configured to transmit and receive signals only of frequencies less than or equal to the threshold frequency.

12. The radio frequency signal booster of claim 1, further comprising a mounting bracket connected to a side of the housing.

13. The radio frequency signal booster of claim 1, further comprising a low-gain antenna port configured to provide and receive the same signals as the mobile station antenna port with a lower gain than the mobile antenna station port.

14. The radio frequency signal booster of claim 1, further comprising a signal processor configured to perform digital interference cancellation only for signals below a threshold frequency, the threshold frequency being less than a frequency of at least one uplink or downlink channel.

15. The radio frequency signal booster of claim 1, further comprising a router.

16. The radio frequency signal booster of claim 15, wherein the router comprises a WiFi router configured to access cellular data from a Universal Serial Bus (USB) dongle.

17. The radio frequency signal booster of claim 15, wherein the router comprises a WiFi router configured to access network data from a cable.

18. The radio frequency signal booster of claim 15, wherein the router comprises a cellular data router configured to receive cellular data via the first base station antenna and to provide a WiFi signal via the mobile station antenna port.

19. The radio frequency signal booster of claim 1, wherein the radio frequency signal booster further comprises:
a circular and concave outer mesh configured to reduce feedback between the first base station antenna and the mobile station antenna port; and
at least one light-emitting diode configured to indicate a system state.

20. The radio frequency signal booster of claim 19, further comprising a base stand.

21. The radio frequency signal booster of claim 20, wherein the system state includes at least one of: a power-good state indicative of whether or not power is sufficient for operation, a signal-strength state indicative of whether or not an external signal has sufficient strength for reception, and an antenna-position state indicative of whether or not a distance between the omnidirectional mobile station antenna connected to the mobile station antenna port and the first base station antenna is sufficient.

22. The radio frequency signal booster of claim 1, further comprising a gain control circuit configured to automatically adjust a gain of the downlink amplifier and/or the uplink amplifier according to a distance between the omnidirectional mobile station antenna connected to the mobile station antenna port and the signal booster.

23. The radio frequency signal booster of claim 1, wherein the base station antenna is integrated on a printed circuit board, wherein the printed circuit board is spaced apart from a portion of the reflector to define a resonant cavity.

24. The radio frequency signal booster of claim 1, further comprising an interference cancellation system (ICS) within the housing and configured to provide signal processing to cancel feedback between the first base station antenna and the omnidirectional mobile station antenna.

25. The radio frequency signal booster of claim 24, wherein the ICS is configured to cancel feedback of one or more low frequency signal bands, and the reflector is configured to cancel feedback for one or more high frequency signal bands.

26. The radio frequency signal booster of claim 24, wherein the ICS is configured to cancel feedback for low frequency signals below 1 GHz, and the reflector is configured to cancel feedback for high frequency signals above 1 GHz.

27. A radio frequency signal booster comprising:
a housing;
a base station antenna located within the housing, the base station antenna configured to receive wireless communications signals on one or more downlink channels and to transmit wireless communications signals on one or more uplink channels;
an omnidirectional mobile station antenna separated from the housing via an RF cable configured to transmit communications signals on one or more downlink channels and to receive wireless communications signals on one or more uplink channels;
a reflector integrated with the housing and configured to isolate the base station antenna from the omnidirectional mobile station antenna;
a downlink amplifier within the housing, the downlink amplifier configured to amplify signals on downlink channels, received at the base station antenna, for transmission through the omnidirectional mobile station antenna; and
an uplink amplifier within the housing, the uplink amplifier configured to amplify signals on uplink channels, received at the omnidirectional mobile station antenna, for transmission through the base station antenna.

28. The radio frequency signal booster of claim 27, further comprising a gain control circuit configured to automatically adjust a gain of the downlink amplifier and/or the uplink amplifier according to a distance between the omnidirectional mobile station antenna and the signal booster.

29. The radio frequency signal booster of claim 27, wherein the reflector is configured to at least partially isolate the omnidirectional mobile station antenna from the base station antenna.

30. The radio frequency signal booster of claim 29, wherein the reflector is connected to and extends beyond the housing.

31. The radio frequency signal booster of claim 27, wherein the reflector extends beyond the base station antenna.

32. The radio frequency signal booster of claim 27, wherein the reflector comprises an RF shield having a first side and a second side opposite the first side, wherein the uplink and downlink amplifiers are positioned on the first side of the RF shield, and the first base station antenna is positioned on the second side of the RF shield.

* * * * *